(12) United States Patent
Lechman et al.

(10) Patent No.: US 9,104,373 B1
(45) Date of Patent: Aug. 11, 2015

(54) ELECTRONIC TABLET STORAGE AND MANAGEMENT APPARATUS AND SYSTEM

(71) Applicant: Nova Solutions, Inc., Effingham, IL (US)

(72) Inventors: John Lechman, Effingham, IL (US); Stephen M Oshgan, Des Plaines, IL (US); Paresh Shroff, Palatine, IL (US); Jason R Gebhardt, Buffalo Grove, IL (US); Patrick J McVey, Palatine, IL (US); Cornelio M Varilla, Des Plaines, IL (US)

(73) Assignee: NOVA SOLUTIONS, INC., Effingham, IL (US)

( * ) Notice: Subject to any disclaimer, the term of this patent is extended or adjusted under 35 U.S.C. 154(b) by 104 days.

(21) Appl. No.: 14/055,777

(22) Filed: Oct. 16, 2013

Related U.S. Application Data

(60) Provisional application No. 61/795,399, filed on Oct. 16, 2012.

(51) Int. Cl.
*G06F 1/16* (2006.01)

(52) U.S. Cl.
CPC .................................. *G06F 1/1632* (2013.01)

(58) Field of Classification Search
None
See application file for complete search history.

(56) References Cited

U.S. PATENT DOCUMENTS

| | | | |
|---|---|---|---|
| 7,325,891 B1 * | 2/2008 | Kinsley et al. | 312/257.1 |
| 8,503,182 B2 * | 8/2013 | Petrick et al. | 361/727 |
| 8,665,584 B2 * | 3/2014 | Pence | 361/679.02 |
| 8,976,512 B2 * | 3/2015 | Richardson et al. | 361/679.01 |
| 2011/0267782 A1 * | 11/2011 | Petrick et al. | 361/724 |

* cited by examiner

*Primary Examiner* — Anthony Q Edwards
(74) *Attorney, Agent, or Firm* — Rod D. Baker

(57) ABSTRACT

A computer tablet storage system. The system may have one or many main docks and one or many tablet holders. A computer tablet is retained within each tablet holder, and the tablet holder is insertable into and removable from an associated main dock. While inside the main dock, the computer tablet is protected against damage and unauthorized use. The main dock includes a door aperture and a tablet tray assembly movable toward and away from the bay door aperture and within the dock housing. The tablet holder (with tablet therein) is releasably engageable with the tray assembly. In the system, the tablet tray assembly is movable between a forward position in which a tablet is extended through the bay door for use, and a tray back position in which the tablet is retracted completely within the dock housing interior. A master control may regulate operation of the system.

14 Claims, 18 Drawing Sheets

ELECTRONIC TABLET STORAGE AND MANAGEMENT APPARATUS AND SYSTEM

CROSS-REFERENCE TO RELATED APPLICATIONS

This application claims the benefit of the filing of U.S. Provisional Patent Application Ser. No. 61/795,399 entitled "Electronic Tablet Storage and Management Apparatus and System," filed on 16 Oct. 2012, the entire disclosure of which is incorporated herein by reference.

BACKGROUND OF THE INVENTION

The present invention relates generally to systems for storing and managing access to and use of electronic devices. More particularly, the disclosed invention relates to a system and apparatus for managed storage and use of one or more portable digital tablet computing devices.

Portable hand-held computers, often called "tablets," are rapidly increasing in popularity and use in a wide variety of contexts and settings. Digital tablets are flat portable computer devices, adapted and sized for use while held in a user's hand. A "tablet" for purposes of this disclosure thus includes a mobile computer, typically integrated with a flat touch screen, and primarily (but not necessarily exclusively) operated by touching the screen rather than using a physical keyboard. Tablets often use an onscreen "virtual keyboard." Some older or specialized tablets receive input from a stylus created specifically for the device, and electrical sensors in the face of the tablet detect the pen and allow the user to input information.

Much more commonly, and more important currently, are the aforementioned touch-pad tablets, in which pressure-sensitive icons are operated by the tips of the user's fingers. Such tablet computer devices most frequently use capacitive touch screens with "multi-touch" capabilities, unlike the earlier stylus-driven resistive touchscreen devices. Some tablets allow a user to execute word processing and spreadsheets, while certain and selected others permit not only these activities, but also media consumption and generation such as web browsing, email and social media, GPS satellite navigation, photo stills and video camera functions, photo and video viewing and editing, downloadable "apps," portable media player functions, and/or "e-reading" capabilities. Widely popular tablets include the nine-inch (diagonal) screen iPad® devices available from Apple, Inc., and the Samsung Galaxy Tab® device from Samsung Electronics Co. Other tablet manufacturers include HTC, Motorola, Sony, and Microsoft. There is a widely held perception that mobile tablet computers will render obsolete the standard "desk top" computers in many contexts, including educational settings.

Besides their increasing popularity in the consumer market generally, tablet computers are used increasingly in institutional contexts, particularly schools and universities. The availability of computers, especially including portable tablet-type devices, will increasingly become an integral and essential qualification for a student's daily tasks. However, with the advantages of a portable tablet computer come the attendant disadvantages of storing the tablets and controlling their accessibility and use, especially in instructional settings involving many students simultaneously. Improperly stored and/or managed tablets are vulnerable not only to adverse environmental conditions, but also to tampering and theft. Further, it is desirable to provide means by which a supervisor, such as a teacher or proctor, can monitor the condition and use of many tablet devices in, for example, a classroom setting, and assure their replacement and proper storage when not in use.

Against the foregoing background, the present system was developed.

SUMMARY OF THE INVENTION

There is disclosed hereafter a computer tablet storage system featuring a main dock and a tablet holder. A system according to the invention may have one or many main docks and one or many tablet holders, although the number of main docks ordinarily will equal the number of tablet holders. A computer tablet is retained within each tablet holder, and the tablet holder is insertable into and removable from an associated main dock. While inside the main dock, the tablet is secure and may be protected against damage and unauthorized use. The main dock includes a front panel assembly defining a bay door aperture; a dock housing substantially enclosing a hollow interior; a tablet tray assembly movable toward and away from the bay door aperture and within the interior of the dock housing; and means, such as a controllable motor cooperative with gears/pinions, for moving the tablet tray assembly within the dock housing. The tablet holder is releasably engageable with the tray assembly, and is adapted to receive and retain a computer tablet. In the system, the tablet tray assembly is movable between a tray forward position in which any tablet holder engaged with the tray assembly is at least partially extended through the bay door aperture by the movement of the tray assembly, and a tray back position in which any tablet engaged with the tray assembly is retracted completely within the dock housing interior.

BRIEF DESCRIPTION OF THE DRAWINGS

The attached drawings, which are part of this utility application disclosure, are as follows.

Figure 1:
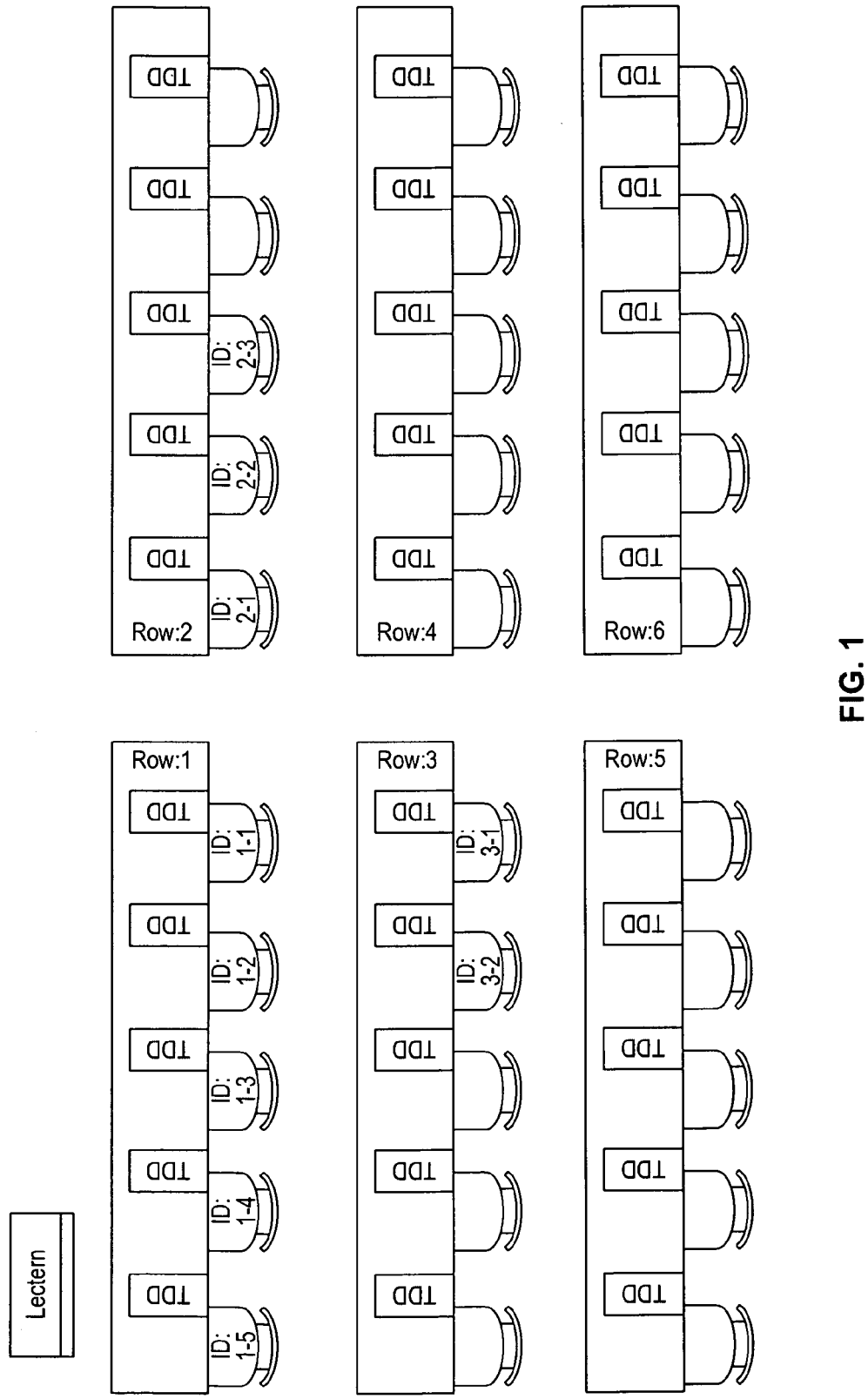
FIG. 1 is a diagrammatic plan view of an example of a classroom layout of a possible system according to the present disclosure, the plurality of individual tablet docking stations being in linked communication with a master control at a lectern.

Certain component label numerals provided in the text hereinafter provide the figure number followed by the component number in that view; e.g., label numeral 11-3 refers to component labeled number 3 in drawing figure number 11. The various drawing figures are not necessarily to scale, either between figures or within a single FIGURE.

DESCRIPTION OF EMBODIMENTS OF THE INVENTION

There is disclosed hereby a system and apparatus for providing regulated storage and use of one or more mobile digital tablet devices. The system according to this disclosure may be referred to generally herein by an acronym "TDD system." There is in a TDD system at least one tablet delivery device (TDD) apparatus. The TDD apparatus in its very simplest embodiment features a docking station featuring a main dock and a tablet holder. The tablet holder houses and protects an individual associated tablet. The tablet holder, with a tablet situated therein, also interacts with the main dock of the docking station. It is contemplated, but not required, that an "undocked" tablet is used in the general vicinity of its associated dock.

The docking station is adapted for installation upon, for example, a desk, table, workstation, or other substantial foundation where the tablet computer is to be stored for use, there being one docking station provided for each tablet. The foundation, such as the desk, cart, or heavy-duty table, preferably is located proximately to, or is in communication with, a suitable power source, so that the TDD system may be supplied with electrical power during use, and the tablet(s) batteries can be charged during tablet storage.

The main dock of a docking station preferably is very securely mounted and installed in or on the foundation, such that a tablet computer is secured against unauthorized access and theft. This may be accomplished, for example, through the usage of tamper-resistant screws (e.g., machine threaded, rather than self-tapping), perhaps in relatively hidden or inaccessible locations. An object of the invention is that the tablet is difficult to remove from its tablet holder, the tablet holder is difficult to remove from its associated dock, and the dock is difficult to detach from its foundation, without proper authorization and tools/keys. The preferred means for mounting a main dock to its foundation promotes serviceability longevity; that is, the dock can be repeatedly be removed and re-installed while minimizing damage to the fastener holes (typically screw holes) in the foundation. For example, "key hole" type fastener holes in the dock housing permit the dock to be shifted slightly, and then detached, from its foundation by loosening, but not completely removing, fastener screws extending through the key holes.

One or more docking stations also could be mounted, for example, on or in a bookcase or cabinet; a plurality of tablets may be retrievably stored in a central location. Further, a plurality of docking stations may be mounted and installed for use upon a movable foundation, such as a wheeled cart or dolly, so that many tablets can be stored (and charged) thereon, and yet authorized personnel can, for example, roll the cart or dolly in and out of a lockable classroom closet. In such a context, multiple docks are stacked and physically mounted or integrated with the cart; users thus may restore a plurality of tablets to a secure central storage/charging location from disparate and potentially widely dispersed usage locations.

The present system further provides for controlled and monitored usage of a plurality of tablets from a central location, such as a classroom lectern. The preferred embodiment of the TDD system features communication (preferably wireless) between a master control and one or more main docking stations integrated in the system, whereby a supervising user of the system may operate the master control to activate/deactivate a smart button at all (or selected ones) the docking stations. Such an arrangement provides that the docking station(s) cannot be operated by individual users unless access is granted by a supervisor at the master control. The communication between the master control and the docking station(s) optionally may be two-way to permit, for example: (1) error reporting (signal to master control display) from any docking station suffering a mechanical jam or other operational error; and/or (2) successful docking notification (i.e., signal to master control display reporting when a tablet holder is successfully docked, allowing the supervising user to know when tablet(s) are returned and docked). However, a preferred embodiment may have a simple one-way communication, whereby the main dock is "locked" or "unlocked" by means of an enabling/disabling signal communication from the master control to the main dock.

There are disclosed hereafter options for how the TDD system is powered, and how data may flow in the system for monitoring and controlling usage of one or more tablets. In one optional embodiment of a TDD system, each docking station is supplied by power over Ethernet (PoE), whereby each docking station is supplied with electrical power via CAT 5 or CAT 6 cable. The docking stations may be hardwired (in parallel) to a common source of electrical energy. For example, a transformer(s) bank may receive, for example conventional 110 VAC (0.5 amp) current, and step the current down to about 5.2 VDC (about 2.4 amp) for distribution to a grouped plurality of main docks.

Figure 11:
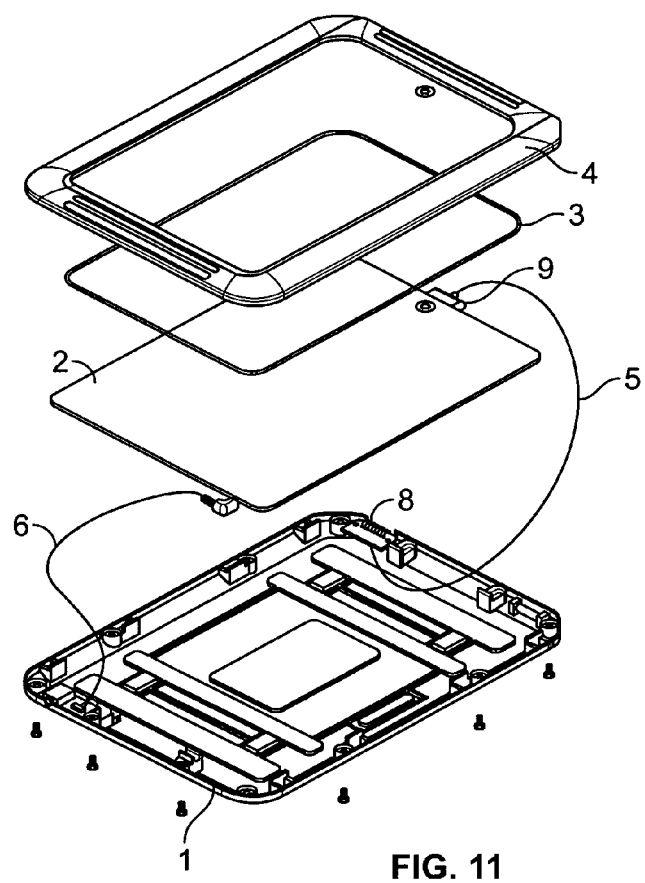
FIG. 11 is an exploded view of a tablet holder assembly according to the present disclosure, and showing how a computer tablet is contained within the tablet holder.
Figure 12:
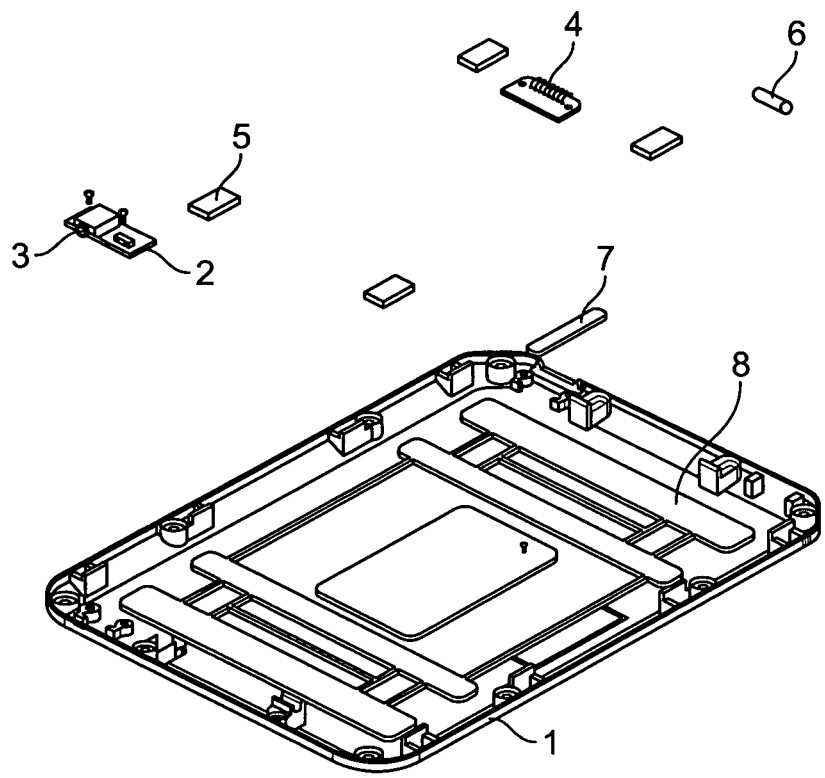
FIG. 12 is an additional exploded view of the bottom tablet assembly portion of the tablet holder seen in FIG. 11, showing additional selected internal features and components.

Thus a system according to the present disclosure includes at least one main dock 30 in cooperative utility with a tablet holder 40, which tablet holder retains a portable tablet computer for use in the system. A main dock 30 is depicted generally in FIGS. 5A, 5B, and 6A-C herein, while additional possible details of the dock, such as the dock 30, are provided with reference to FIGS. 7-10. A tablet holder 40 is shown generally in FIGS. 6B and 6C, while illustrative details of such a holder 40 are shown in FIGS. 11 and 12.

Figure 5A:
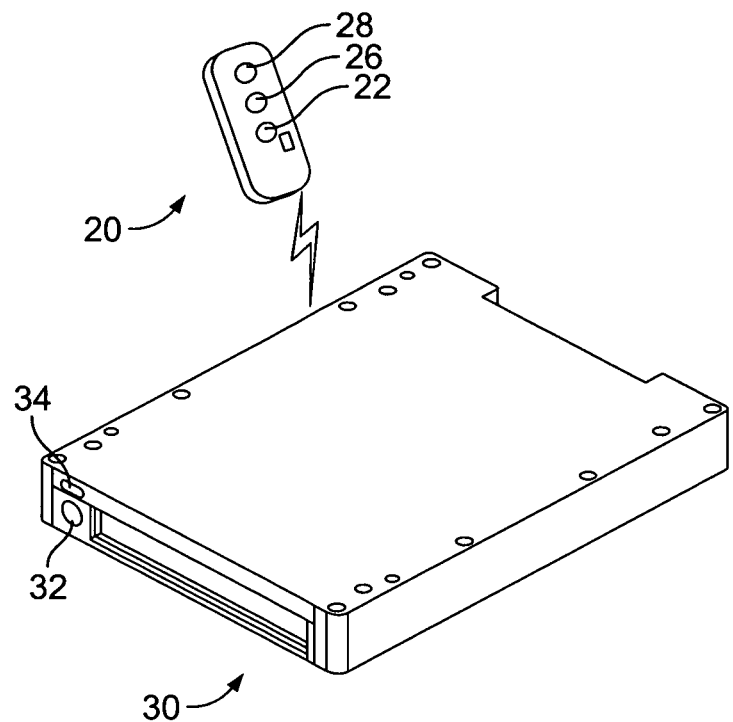
FIG. 5A is a perspective view from above of the front of a possible main dock apparatus according to the present disclosure, also depicting a master control apparatus in signal communication with the main dock.

A master control 20 is in signal communication with the dock 30 in any of several ways described further herein. In one basic version of the TDD system, the docking and undocking sequences are controlled via the master control, such as the control 20 seen in FIG. 5A. The master control may be a remote control having buttons for manual operation by the supervisor (e.g., parent or classroom instructor.) Referring to FIG. 5A, the remote master control 20 may have an indicator light 22 indicating the charged battery or powered status of the control. There also is provided an appropriately labeled or colored lock button 26 which, when depressed, causes the control 20 to transmit a "lock" signal to the dock(s) 30. An unlock button 28 causes transmission of an "unlock" signal to the dock(s) of the system. The lock and unlock signals open and close a smart button circuit in each dock 30, disabling or enabling the dock's smart button 32.

The disclosed TDD system may find particular utility in classroom settings. Reference is invited to FIG. 1, showing that in one possible application of the invention, a plurality of individual TDD docking stations (thirty depicted in FIG. 1, each individually labeled as TDD) are deployed in a classroom layout. Each docking station TDD is, as seen in the figure, adjacent to and associated with a student workstation (individual student chairs are seen in plan view in FIG. 1). Each docking station is mounted upon a foundation, in the illustrated embodiment a long table 10. (FIG. 1 shows thirty docking stations TDD, five stations on each of six foundation tables 10.) In this embodiment of the inventive system, each docking station is in wireless communication with a master control 20 at a central location, such as a lectern. The master control 20 includes indicator light(s) and button(s) for communicating (electronically, preferably wirelessly) with the various docking stations. A supervisory user, such as a teacher, may control the docking stations TDD from the master control 20.

In preferred embodiments using a plurality of docking stations in communication with a central master control 20, a linking system is provided. Such a linking system may exploit any suitable known or yet to be developed wired or wireless communications components and techniques, for permitting the master control 20 to transmit command and control signals to the docking stations TDD. Possible linking systems also permit communication signals to be transmitted from individual docking stations to the master control.

Figure 2:
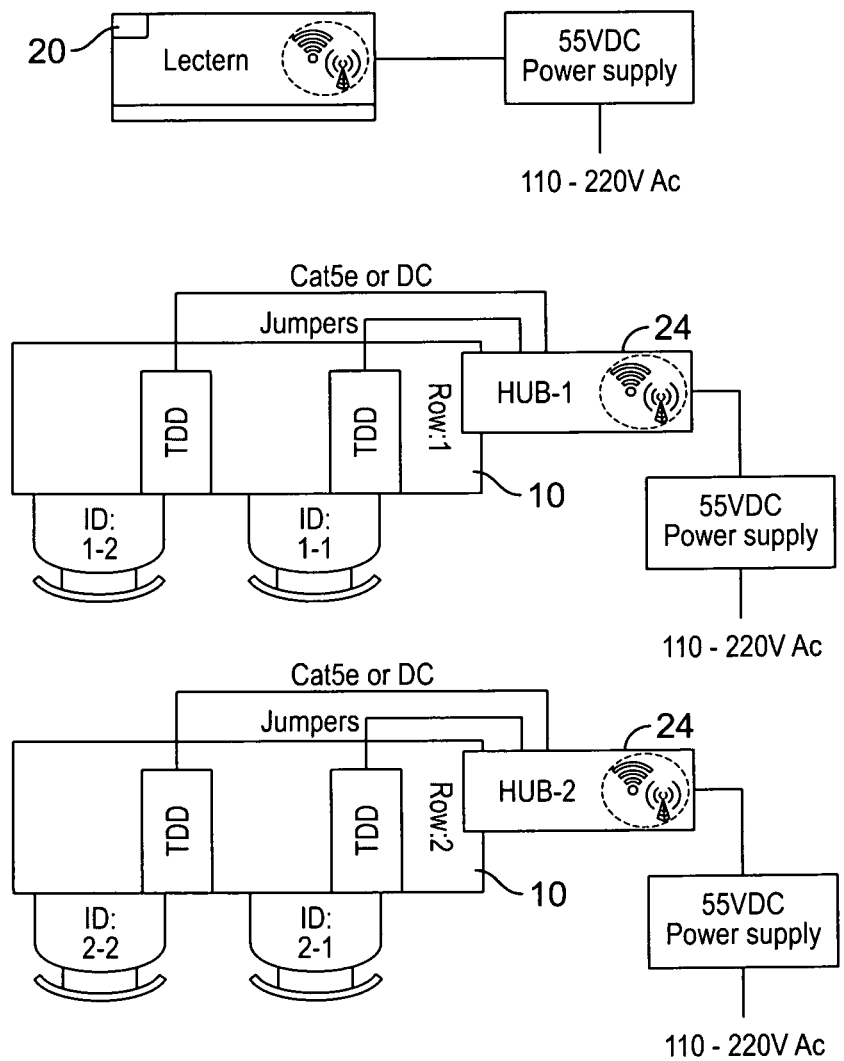
FIG. 2 is a diagrammatic view of a system according to the present disclosure, related to FIG. 1, showing a preferred transceiver linking embodiment for providing intercommunication between the tablet docking stations and the master control in the lectern.

FIG. 2 indicates a possible powering and signaling linking scheme for a TDD system according to the present disclosure, featuring a plurality of docking stations controllable from the master control 20 at the lectern. One or more system hubs 24 are in communication with the master control 20 at the lectern. One or more docking stations TDD are operationally associated with a corresponding system hub (HUB-1, HUB-2, etc.). The master control 20 at the lectern is powered by, for example, a hard wire from, for example, a 55-volt DC power supply. The DC power supply may include a transformer and rectifier(s) for stepping down the electrical power supplied from the building's conventional (e.g. 110V or 220V) alternating current supply. Similarly, each system hub 24 preferably is provided with, for example, 55VDC power from a hard wire. Electrical power then preferably is supplied from a system hub 24 to each of its associated docking stations via a DC jumper wire or a Cat-5e cable; alternative or back-up means of power delivery to the docking stations TDD may be provided. Notably, the system may employ power-over-Ethernet technology and standard RJ-45 connectors, whereby Ethernet networked devices receive both power and data over ordinary CAT-5 Ethernet cable.

In this embodiment, there is two-way communication between the master control 20 (i.e., at the lectern) and the various system hubs. This two-way communication is by means of a transceiver (e.g., 900 MHz or 2.4 GHz) at the master control 20 and a transceiver in each system hub 24. Two-way communication between each docking station TDD and its system hub 24 is by the CAT-5e hardwire. Alternatively, a Wi-Fi communication may be established between a system hub 24 and its respective docking stations, whereby an individual docking station TDD does not report to the master control 29; rather, a docking station reports to its associated system hub 24, and that system hub then reports to the master control. Similarly, communication from the master control 20 to a given docking station is via the intermediate corresponding system hub 24.

Figure 3:
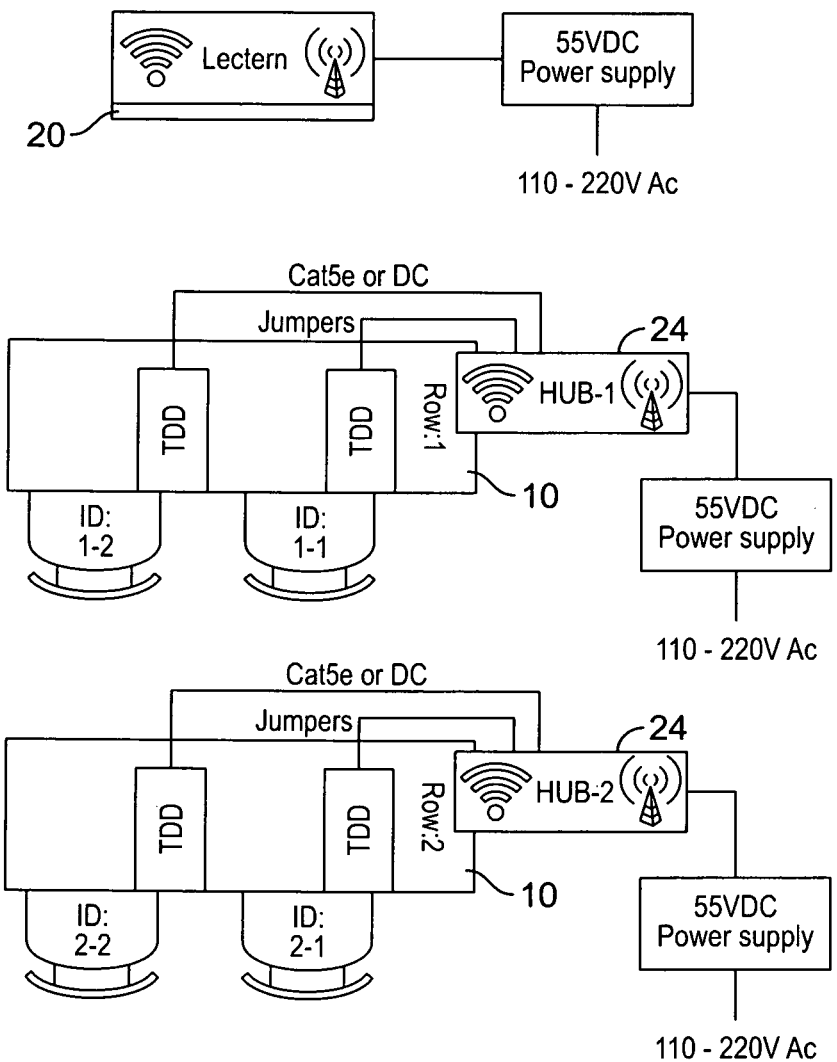
FIG. 3 is a diagrammatic view, related to FIG. 2, showing an alternative hybrid paired transmitter/receiver linking embodiment for providing intercommunication between the docking stations and the master control in the lectern.

A possible "hybrid" linking system is depicted diagrammatically in FIG. 3. This hybrid system shares some features with the transceiver linking system of FIG. 2. However, this hybrid system utilizes a regime of paired transmitter and receiver at each system hub 24, as well as a transmitter and receiver at the master control 20. Thus, more radio communicators (transmitters and separate receivers) are required than in an embodiment deploying transceivers at each hub and in the master control. The master control transmitter sends commands to a receiver at a system hub, and the system hub transmits a report signal back to the master control receiver, thereby providing two-way communication between hub and the master control. A docking station TDD does not transmit to the master control receiver; rather, a docking station communicates (e.g., via cable) with its associated system hub 24, and the hub communicates with the master control. The hub sends command signals via, for example, CAT-5e cable to regulate operation of a docking station. The various antennae should be carefully located to minimize "cross talk" problem between hubs, for example.

Figure 4:
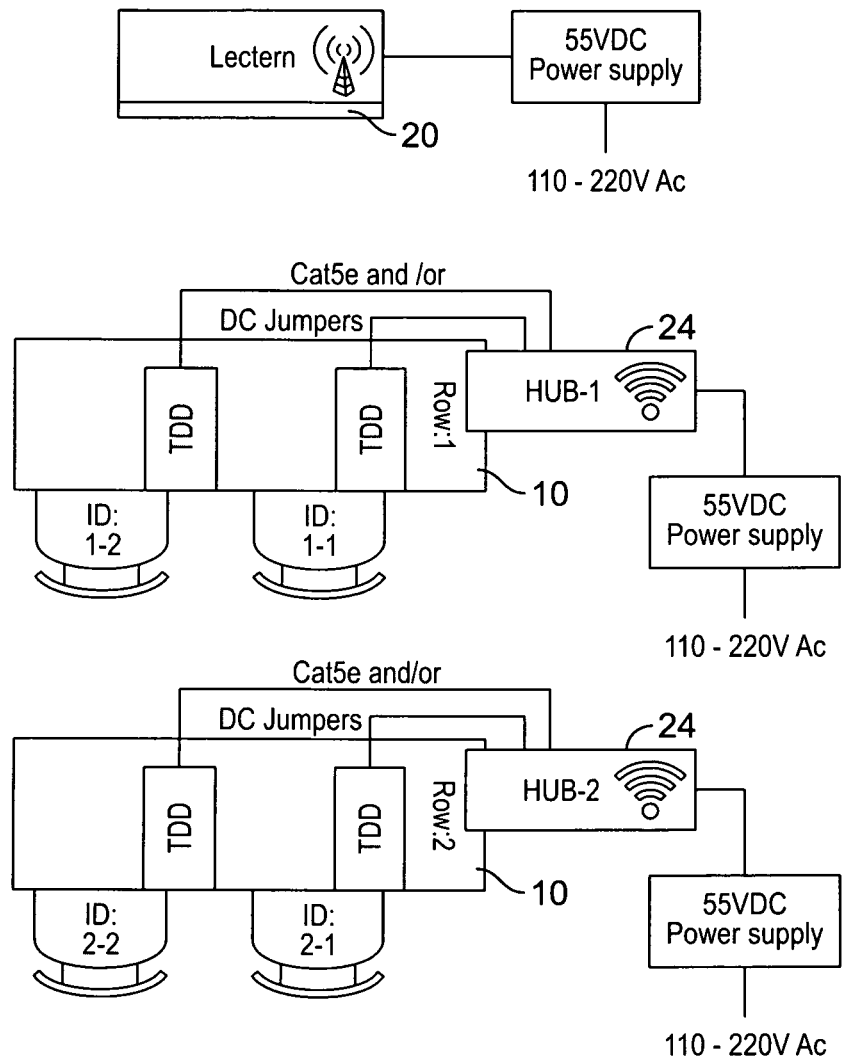
FIG. 4 is a diagrammatic view, somewhat related to FIG. 3, showing an alternative linking embodiment for providing one-way communication from the master control in the lectern to the plurality of individual docking stations.

Still another alternative embodiment of a possible TDD system with a plurality of docking stations and a central control is depicted in FIG. 4. The system of FIG. 4 is similar in some general respects to that of FIG. 2, with the exception that communication is one-way between the master control 20 and the system hubs 24. The master control 20 (i.e. at the lectern) operates a transmitter (e.g. 433 MHz), and each system hub 24 is equipped with a compatible receiver. The supervising user may operate the master control to transmit wirelessly commands to a system hub, but the hub cannot respond back to the master control. Thus an individual docking station TDD cannot report to the master control, and a system hub cannot transmit to the master control. A docking station can, however, transmit signals to its associated system hub via Wi-Fi or the Ethernet (CAT-5) connection. A hub, receiving command(s) from the lectern's master control, allows regulation and control of each of its docking stations by means of signals transmitted via that hub. An advantage of one-way communication from master control to docking station, as described, is the elimination of the possibility of "cross talk" between system hubs, or miscommunication from the master control to the "wrong" system hub. Accordingly, the advantage could be realized in an alternative embodiment in which the one-way communication is from the docking station to the master control, in the same general transmitter-receiver set up. The embodiment of FIG. 4 is similar to and may be adaptable from a system currently commercially available from Nova Solutions, Inc., of Effingham, Ill., USA, under its NOVALINKED system for regulating access to multi-station computer monitors. The NOVALINKED system is described in U.S. Patent Application Publication No. 2013/0018510, published on 17 Jan. 2013, the entire disclosure of which is incorporated herein by reference. This embodiment also may be adapted to be compatible and used with commercially available multi-station control systems, such as CRESTON systems, AMX systems, and EXTRON systems.

Figure 5B:
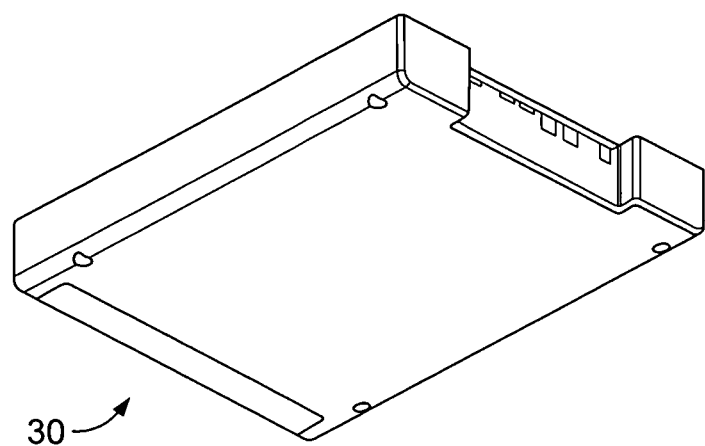
FIG. 5B is a perspective view from below of the back of the main dock apparatus seen in FIG. 5A.

Yet another alternative embodiment may have each docking station communicate directly with the master control 20 through Wi-Fi transmission or the like. It may be desired in domestic residential setting, for example, for a parent to have direct control over a few, perhaps even a single, portable computer tablet used by a the parent's child. The parent may desire to regulate frequency and duration of use of a tablet by the child(ren), in which case the tablet can be secured inside a main dock 30 such as that seen in FIG. 5A. FIGS. 5A and 5B show a single main dock 30 in isolation from any particular foundation (not seen in FIGS. 5A and 5B). It should be understood that the main dock 30 when in use is installed securely to a foundation, such as a table, desk, inside a wall-mounted cabinet, or the like. When only one or a small few (e.g., 2-4) tablets are under such regulation by the parent, a single portable master control 20 is provided which is in wireless communication with each main dock 30 by, for example, infrared, RF, BLUETOOTH®, or any other suitably adapted communication protocol. Thus the parent or other supervisor's master control 20 effectively is a remote control for the main dock 30. The supervisor, who has strictly limited access to the master control 20 (e.g. of FIGS. 5A and 5B), controls access to the tablet inside the main dock 30.

Docking Station
Main Dock

The docking station features a main dock in which the tablet is stored when not in use. The main dock includes a main dock housing body which houses or mounts the other assemblies and elements of a docking station. A typical dock housing body has a bottom, two lateral sides, and a back end, which may be molded as an integral unit. The substantially hollow interior of the dock housing body preferably is provided with reinforcement ribs to lend the body structural strength, and also features lugs for receiving screws or other attachment means whereby other elements may be fastened within or to the body. When fully assembled, the dock is covered by a dock top cover, which is attached to the dock body by any suitable means to provide a secure enclosure for the main dock. The main dock includes a front panel assembly for enclosing the front of the main dock. The front panel assembly, to be described more fully herein, includes a bay door and defines a bay door aperture by which means a tablet holder (and tablet) can be inserted into and retrieved from the interior of the main dock.

As mentioned, the dock includes a main dock body fabricated from a suitable durable and substantially rigid material such as high-pressure injection molded plastic (e.g., ABS or PCABS). A bay door aperture is defined in the front panel assembly of the main dock, through (into and out of) which the tablet passes when being extended/ejected and inserted/retracted.

Attention is invited to FIGS. 5A and 5B providing isolated views of a preferred embodiment of a TDD main dock 30. FIG. 5A is a perspective view of the front and top of an assembled dock 30. The main dock 30 is depicted with a master remote control 20, which is in the simplest embedment of the system is in wireless communication with at least one dock 30. Seen in FIGS. 5A and 5B is the box-like main dock body, which has a bottom with two sidewalls perpendicular to the bottom. Visible at the front of the main dock 30 is the front panel assembly, including a main or bay door assembly, to be described further herein. The dock top cover is visible, fastened to the top of the main dock body. FIG. 5B is a perspective view of the back and bottom of an assembled dock 30. FIG. 5B suggests that the bottom of the dock body preferably is molded integrally with the two side walls and the back wall. Visible in the back wall are various jacks and ports (e.g. for receiving RJ-45 connectors) and sockets by which cables and cords may be plugged into the main dock 30.

Figure 6A:
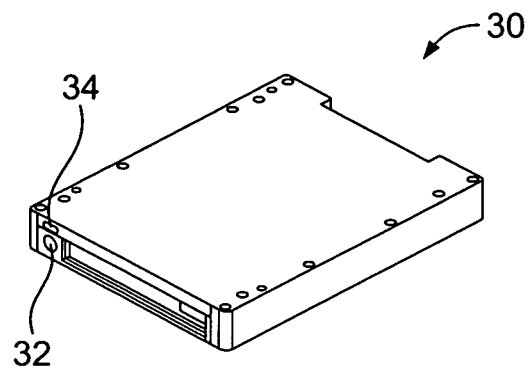
FIG. 6A is a perspective view from above of the front of a possible main dock apparatus according to the present disclosure.
Figure 6B:
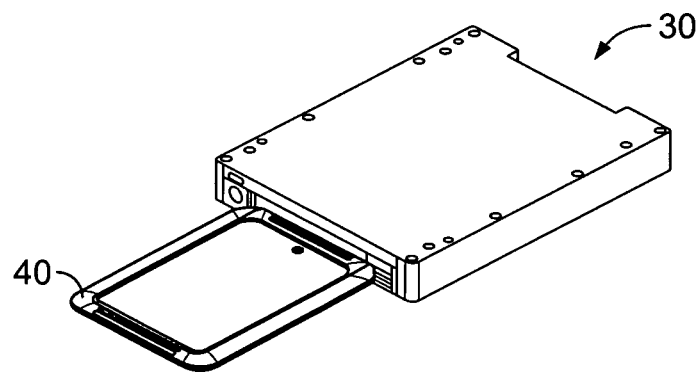
FIG. 6B is a perspective view from above of the front of a main dock apparatus according to the present disclosure, similar to the view in FIG. 6A, showing a tablet holder apparatus according to this disclosure in proximity with the bay door of the main dock apparatus.
Figure 6C:
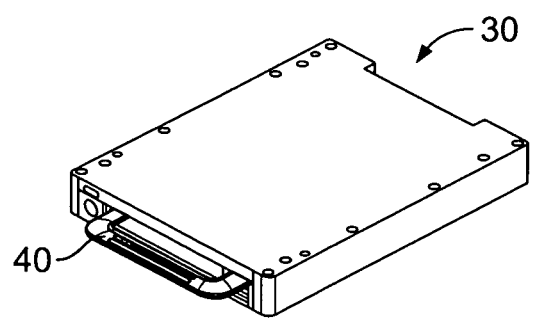
FIG. 6C is a perspective view from above of the front of a main dock apparatus according to the present disclosure, similar to the view in FIG. 6B, but showing the tablet holder apparatus partially inserted/ejected into/from the main dock, via the bay door, and prior to the tablet holder being fully withdrawn/retracted into the main dock.

A docking station also includes a tablet holder, which holds the tablet and promotes its proper operational engagement with the main dock. FIG. 6A shows a main dock 30 similar to that seen in FIG. 5A. FIG. 6A depicts a possible tablet holder 40 according to the present disclosure, containing its associated tablet. In FIG. 6B, the tablet holder 40 is seen located close to the front panel assembly (including the bay door) of the main dock 30. The tablet holder 40 is in position for insertion into the main dock 30; the tablet holder 40 is proximate to and aligned with the bay door aperture of the dock. During operation of the docking station, the bay door opens, and the tablet holder 40 (containing the tablet) is manually inserted into the main dock 30. The tablet holder 40 engages with a movable tray assembly (not visible in FIGS. 6A-6C) inside the main dock body. FIG. 6C illustrates the position of the tablet holder 40 after the tablet holder has been engaged into the tray assembly, just prior to the rearward movement of the tray assembly. The docking station then operates to retract the tablet holder 40 completely within the main dock 30, the bay door closes, and the tablet holder is secured within the dock body. The docking station with the tablet holder 40 within the dock 30 appears as seen in FIG. 6A. When a user desires access to the tablet, the bay door opens, the tray assembly moves forward within the main dock 30, and the tablet holder 40 is presented to the user in the position of FIG. 6C. The user grasps the tablet holder 40 and withdraws it from the main dock 30 (e.g., FIG. 6B), and the tray assembly moves backward in the dock 30 and the bay door shuts as the docking station resumes its appearance of FIG. 6A.

The main dock 30 houses motor and gearing components by which a tablet tray is controllably driven to move back and forth within the hollow interior of the dock body. The motor and gearing components hereinafter describe serve as means for moving the tablet tray assembly (including the tray itself) forward and backward within the dock housing. Functions of the dock 30 are electrically powered, preferably by a relatively low-voltage direct current. The dock preferably is hardwired to a DC power source; nevertheless, in a preferred embodiment, the dock 30 is provided (e.g. at the rear of the dock) with a conventional DC port to permit alternative DC powering option in the event a dock is used in, for example, an individual personalized or non-classroom environment. Operation regulation, and signal generation and processing, is provided by means including digital computing printed circuit board(s) within the dock 30. The tray assembly, which receives and releasably engages the tablet holder (which in turn holds a tablet computer) has powered movement forward in the dock 30, and backward in the dock, respectively to retract the tray into a home position for storing the tablet inside the dock, and to shift the tray forward to present a portion of the tablet holder 40 outside the dock for retrieval by the user. The motor drive preferably is provided with over-torque and/or high current sensors to prevent damage to the system in the event of jams, motion obstructions, or similar malfunctions. A spring assist optionally may be provided in the dock 30 to allow non-motorized partial ejection of the tablet for use. A swinging or rotating bay door preferably is provided on the front panel of the dock body, to cover or close the bay door aperture when the tablet tray is not in use, thereby to improve stored tablet security and to prevent foreign matter from entering the interior of the dock 30. The movement (opening/closing) of the bay door preferably is controllably motor-driven. Like the drive for the tray assembly, the motor drive for the bay door preferably is provided with over-torque and/or high current sensors to prevent damage to the system (or harm to the user's hand) in the event of jams or obstructions.

There may be supplied in the dock 30 an auxiliary charging port (such as a USB port) for other device charging via the dock.

There further is provided a mechanical means whereby movement of the tray assembly in the dock housing effectuates an unlocking/locking interaction between the tablet holder and the dock, whereby the tablet holder 40 is secured within the dock 30 when the tablet is "docked" and the tablet tray assembly is in a home or "tray back" position within the dock housing. For instance, a fixed ramp feature within the dock 30 may co-act with a moveable element on the tablet tray assembly, such that the linear movement of the tray assembly relative to the ramp engages/disengages with the element to lock/unlock the tablet holder in the tray. In alternative embodiments, a sensor (e.g. infrared transmitter/detector) may be provided in the vicinity of the dock's bay door aperture to detect and signal the insertion of a foreign object into the aperture during the time the bay door is open but no tablet is present.

The dock body preferably features on its exterior (as seen, e.g., in FIGS. 5A and 6A), preferably on the front panel, a "smart button" 32. The smart button 32 on the main dock, is a button means by which a user actuates motor, gearing, and switching means for moving the tablet tray assembly within the dock housing, thereby to execute the function of the docking station, including the dock opening (undock sequence) operation. The smart button 32 may be a capacitive sensing device, similar to those used on tablet computers, which exploits capacitive coupling for operation. Or, the smart button may be a small resistive touch screen type of button, or even employ simpler mechanical switching, to initiate action sequences of the docking station. The smart button 32 on the dock 30 preferably is the sole control button at a docking station.

The bay door on the dock 30 opens at the beginning of a docking or undocking sequence, either of which may be initiated by the user's manual operation of the smart button 32 at his docking station. Alternatively, in possible embodiments a docking or undocking sequence may be started by the operation of the master control 20 by a supervising user. Preferably, however, there is provided means for "early docking," whereby an individual user may operate his smart button 32 to initiate the opening of the bay door and the commencement of the docking sequence at his docking station independently of the master control. Alternatively, and as explained further herein, a docking sequence may be commenced by the tablet user by simply bringing the tablet holder 40 in a proper proximate position near the bay door of the main dock 30.

One or more indicators, such as one or more lights 34 (such as, for example only, red/and or green LEDs, optionally capable of variable or intermittent brilliance) are provided on the front panel or other outer surface of the dock 30 to indicate the docking station status (e.g., tablet ready, dock locked, etc.). The indicator light 34 on the dock 30 preferably provides visual indication of the charged status of a docked tablet's battery (for those tablet models able to output battery charge status though their charge port). A preferred embodiment of the dock 30 also includes a built-in sensor (such as a reed switch, not shown in FIG. 5A-B or 6A-C) which is triggered (i.e., by a magnet in the tablet holder 40) to detect when the tablet holder 40 is removed (to signal the automatic closure of the dock's bay door), and/or is brought near the dock's aperture (in which case the dock bay door automatically opens). In embodiments including the automatic opening of the dock bay door (by the detection of tablet holder 40 proximity by the built-in reed switch or Hall Effect sensor), the tablet docking sequence may also be automatically initiated, in which case the bay door opens immediately—which may necessitate separately operable drive motors for the tablet tray and the bay door. The bay door may be spring-loaded when closing to minimize pinching, but preferably is motorized to open and close, with electrical or mechanical overload protection. The dock's bay door may operate in communication with suitable limit switches to detect door position so that the dock 30 is not left inadvertently "open."

There may be provided, in certain embodiments, in combination with the dock 30, a metal holder customized (e.g., from sheet metal, not depicted in drawing figures) to receive and hold securely the dock, which holder is devised to be mounted upon the foundation (table, desk, etc.). In such embodiments, the dock housing has features defined thereon, whereby the metal holder releasably holds the dock 30 in place, but the dock can be removed from the holder for servicing or replacement. It is preferred in all embodiments, however, that the dock 30 is configured and assembled such that in a preferred installation of upon a foundation (e.g., table or cart), the only screws accessible are those used to mount the dock to the foundation. Alternatively, the dock housing may be devised and configured according to security concepts known in the art, whereby a specialized key or tool is required to open the dock housing to obtain access to interiorly disposed screws or other fasteners for mounting the dock to the foundation.

Figure 7:
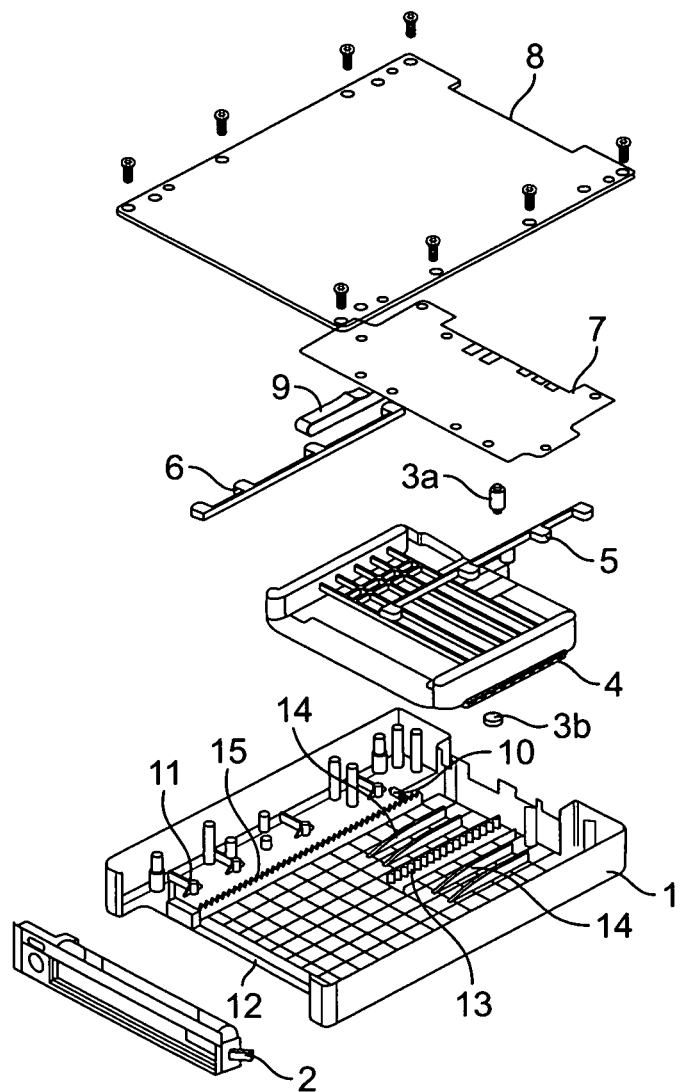
FIG. 7 is an exploded view of a preferred embodiment of the main dock assembly according to the present disclosure, showing some principle and internal components.

Attention is invited to FIG. 7, illustrating details of a possible embodiment of a main dock corresponding generally to the main dock 30 depicted in FIGS. 5A-B and FIGS. 6A-C. As mentioned, the main dock housing 7-1 is a flat box (e.g. molded ABS) for containing the other functional components of the main dock. Most of the contained components of the main dock (e.g. dock 30) are fabricated from suitable molded plastic, or of stamped metals. Securely attached to the front of the main dock housing 7-1, by means including a front panel bracket 7-12 on the dock housing, is the front panel assembly 7-2 including the bay door, which shall be described further. Also seen in FIG. 7 is the tablet tray assembly 7-4 which moves forward and backward within the main dock housing. The powered motion of the tray assembly 7-4 is provided by a motor and gear assembly which, in this embodiment, is located centrally upon the tablet tray assembly. Thus, the motor and gear assembly for driving the tray assembly 7-4 in this embodiment is located upon and moves with the tray assembly itself. The motor and gear assembly includes a motor bracket upon the rear of the tray assembly 7-4, approximately halfway between the lateral sides of the tray assembly, for mounting the tray motor 7-3A to the rear of the tray assembly 7-4. The tray motor 7-3A may be, for example a SOLAROBOTICS brand motor Model GM20. A tray motor gear 7-3B is functionally connected to the drive shaft of the tray motor 7-3A, and is situated below the tray assembly so to be engageable with a notched rack 7-13 defined or affixed upon the inside bottom of the dock housing 7-1. The tray motor gear 7-3B is rotatably mounted in relation to the tray assembly 7-4, and its powered rotation drives the movement of the tablet tray assembly.

Defined or provided on the central inside bottom of the housing 7-1 is a rack 7-13 running along a portion of the housing bottom, e.g., equi-spaced from and parallel to the housing sidewalls as seen in FIG. 7. A series of notches in the rack 7-13 are engageable with the teeth of the tray motor gear 7-3B. The rotary motion of the tray gear 7-3B thus is imparted to the tray assembly 7-4, and converted to linear translation, by a rack-and-pinion type arrangement generally according to known principles. The rotation of the tray motor gear 7-3B engages serially its teeth into successive notches of the rack 7-13. Because the tray assembly 7-4 is moveable but the rack 7-13 is not, the rotating tray gear moves the tray assembly forward and backward within the dock, depending upon the direction of the tray motor gear's rotation.

Positioning and movement of the tray assembly 7-4 within the main dock are guided by a right tray rail 7-5 and a left tray rail 7-6. The tray rails 7-5, 7-6 are disposed mutually parallel within the dock housing 7-1, and are spaced apart a distance corresponding generally to the outside width dimension of the tray assembly 7-4. The rails 7-5, 7-6 may be removably fastened to the inside bottom of the dock housing 7-1 by means of bosses or lugs (four seen along left inside portion of housing in FIG. 7) corresponding to apertured fastener lugs on the outsides of the rails (four seen on each tray rail). Portions (e.g. side flanges below the rails) of the tray assembly 7-4 are in smooth (lubricated, only if needed) sliding contact with the tray rails 7-5, 7-6. The rails 7-5, 7-6 particularly limit vertical shifting (e.g., hold-down) of the tray assembly, thereby maintaining the proper position and alignment of the tray assembly throughout its range of movement. There also preferably is provided a pair of lower guide rails 7-15, 7-16 (only left-side lower guide rail 7-15 seen in FIG. 7; the right-side lower guide rail is located and oriented equivalently on the right side floor of the dock) on the floor of the dock housing 7-1. Each lower guide rail 7-15, 7-16 is adjacent to a corresponding side of the movable tablet tray assembly 7-4, and may be in smooth sliding contact therewith to prevent significant lateral shifting (either to the right or to the left) of the tray assembly during its movements forw3ard and backward within the main dock.

Movement of the tray assembly 7-4 may be regulated electronically by the function of a pair of limit switches, one situated near the inside front of the dock housing 7-1, and a second located near the back of the inside of the dock housing. The tray back limit switch 7-10 is seen in FIG. 7 mounted near the rear region of the dock. Tray back limit switch 7-10 may be, for example, an E-SWITCH brand switch, Model SS0750301F020PIA. The tray forward limit switch 7-11, which likewise may also be a suitably configured E-SWITCH Model SS0750301F020PIA, is located inside the dock housing 7-1 near the front panel assembly 7-2. Actuation of the limit switches 7-10 and 7-11 serve to activate/deactivate operation of the tray motor 7-3A to stop the movement of the tray assembly at the maximum extents of its movement.

The limit switches 7-10, 7-11 are in signal communication with a motherboard processing unit 7-7. The motherboard 7-7 is a processing unit running firmware for the simple signal transception and processing involved in the operation of the TDD system. The firmware runs routines within the ordinary skill of the computer programming arts. The motherboard 7-7 may be mounted inside the dock housing 7-1 and above the tablet tray assembly 7-4 by means of tall mounting bosses (three visible in FIG. 7). Accordingly, the tablet tray assembly is slidably situated between the motherboard 7-7 and the bottom of the dock housing 7-1, and moves forward and back between the limit switches 7-10, 7-11. A flex cable 7-9 connected to the motherboard 7-7 and to the tray assembly 7-4 provides power and signal transmission between them.

It is seen, therefore, that regulated operation of the tray motor 7-3A, by the drive train provided by the tray motor gear 7-3B and the rack 7-13, permits the controlled movement of the tray assembly 7-4 forward and rearward within the dock housing 7-1. The limit switches 7-10, 7-11, in cooperation with the motherboard 7-7 prevent over-extension of the tray assembly's movements by deactivating the tray motor 7-3A at appropriate junctures.

Continued reference is made to FIG. 7. There are defined or provided on the bottom of the dock housing 7-1 at least one, preferably at least two (four seen in FIG. 7), tapered ramps 7-14. The ramps 7-14 are immovable on the floor of the dock's interior. The ramps 7-14 preferably are mutually parallel, and typically are parallel to the sidewalls, and are aligned with one another with respect to their positions front-to-back within the dock. The ramps 7-14 are tapered upwardly, progressing from the front portion of each ramp to the back portion. Thus, the front-most portion of each ramp 7-14 essentially rises from the floor of the dock's interior, and has a front surface or edge that inclines upward to the rear portion. The rear portion of each ramp 7-14 has a top edge that obtains the ramp's maximum height above the dock floor, which top edge runs parallel to the floor for a short distance. These ramps 7-14 are slidably contactable with a tablet holder lock plate 10-2 (FIG. 10) (when the tray assembly 7-4 is moving rearward in the dock, e.g., dock 30 of FIG. 5A) in a manner to be described further herein, releasably to lock the tablet holder (e.g., holder 40 in FIG. 6B, as engaged in the tray assembly) within the dock when the tablet holder is retracted to the home position within the dock.

Also seen in FIG. 7 is the dock top cover 7-8, which is fastened to the top of the dock housing 7-1 to complete the enclosure of the dock. The dock top cover 7-8 may be fastened in place by screws or rivets, for example, there being eight fasteners seen in FIG. 7.

Figure 8:
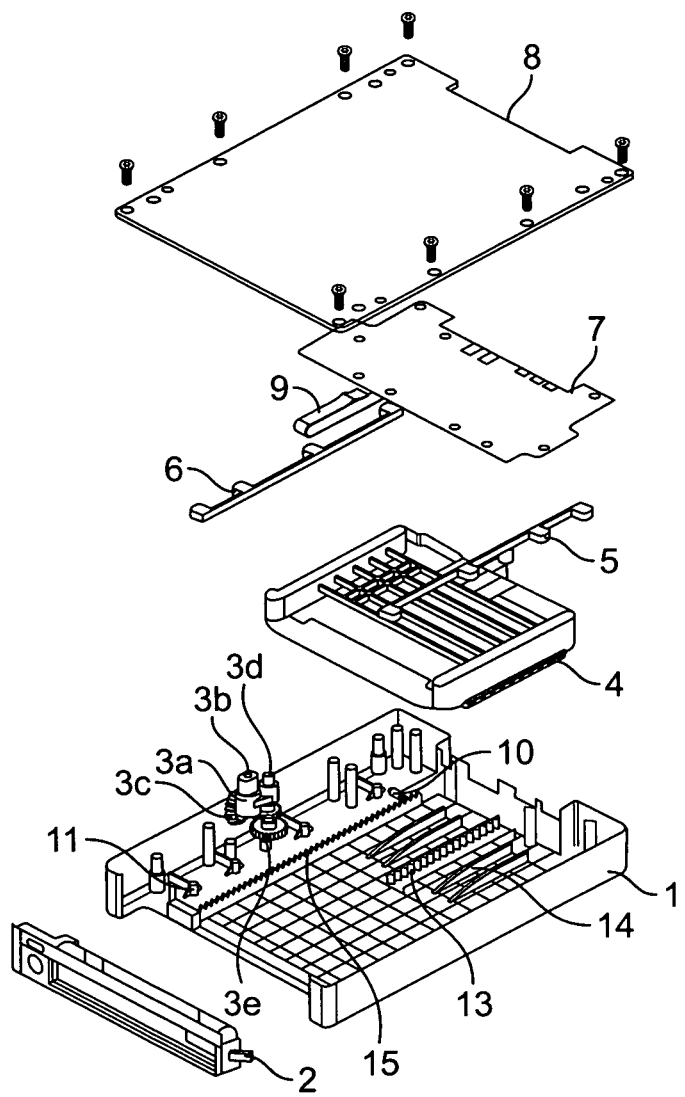
FIG. 8 is an exploded view of an alternative embodiment of the main dock assembly according to the present disclosure, showing some principle and internal components.

Reference is made to FIG. 8 for details of a possible alternative embodiment of the main dock (again, corresponding to dock 30 seen in FIGS. 5A, 5B and FIGS. 6A-C). The main dock housing 8-1 is generally the same as that described for the embodiment of FIG. 7. The front panel assembly 8-2, including the bay door, is secured to the front of the dock housing 8-1. Also seen in FIG. 8 is the tablet tray assembly 8-4 which moves forward and backward within the main dock housing, generally as previously described. The powered motion of the tray assembly 8-4 is provided by a motor and gear assembly which, in this embodiment, is located to one side of the dock's interior (i.e., against the right side wall in FIG. 8). The motor and gear assembly includes a motor bracket 8-3A for mounting the tray motor 8-3B to the interior of the main dock housing 8-1. The tray motor 8-3B may be, for example a POLOLU brand motor, Model 1163. If a POLOLU Model 1163 is utilized, a motor step gear 8-3C is functionally located intermediately between the tray motor 8-3B and the tray gear 8-3E, whereby a driving gear train is provided between the drive shaft of the tray motor and the tray gear. The tray gear 8-3E is rotatably mounted in the dock, and its powered rotation drives the movement of the tablet tray assembly 8-4. An alternative tray motor 8-3D (in lieu of motor 8-3B) is a SOLORBOTICS Model GM20. A SOLORBOTICS tray motor 8-3D offers the possibility of a direct drive from the tray motor shaft to the tray gear 8-3E, advantageously avoiding the need for an intermediate step gear.

Defined in, or provided on, the side of the tray assembly 8-4 adjacent to the tray gear 8-3E is a rack running along the side of the tray assembly and engageable with the teeth of the tray gear. The rotary motion of the tray gear 8-3 thus is imparted to the tray assembly 8-4, and converted to linear translation, by a rack-and-pinion type arrangement generally according to known principles. The rotation of the tray gear 8-3E engages teeth of that gear serially into consecutive notches of the tray assembly's side rack; because the tray assembly 8-4 is moveable but the tray gear is not (except in rotation), the rotating tray gear moves the tray assembly forward and backward within the dock housing 8-1, depending upon the direction of the tray gear's rotation.

Positioning and movement of the tray assembly 8-4 within the main dock are guided by a right tray rail 8-5 and a left tray rail 8-6, and lower guide rails 8-15, 8-16 (only left side lower guide rail 8-15 seen in FIG. 8) generally in accordance with the description of the corresponding tray rail components of the embodiment of FIG. 7. The sides of the tray assembly 8-4 are in smooth (lubricated, only if needed) sliding contact with the tray rails 8-5, 8-6, 8-15, 8-16 to maintain the proper position and alignment of the tray assembly throughout its range of movement.

Generally similarly to the function of the FIG. 7 embodiment, the movement of the tray assembly 8-4 may be regulated electronically by the function of the pair of limit switches. The tray back limit switch 8-10 is seen in FIG. 8 mounted near the rear region of the dock. Tray back limit switch 8-10 may be, for example, an E-SWITCH Model SS0750301F020PIA. The tray forward limit switch 8-11, which likewise may also be a suitably configured E-SWITCH Model SS0750301F020PIA, is located in the dock housing 8-1 near the front panel assembly 8-2. Actuation of the limit switches 8-10 and 8-11 serve to activate/deactivate operation of the tray motor 8-3B or 8-3C to stop the movement of the tray assembly at the maximum reach of its movement.

The limit switches 8-10, 8-11 are in signal communication with a motherboard processing unit 8-7. The motherboard 8-7, is mounted inside the dock housing 8-1 and above the tablet tray assembly 8-4, in accordance with the description of the embodiment of FIG. 7. Accordingly, the tablet tray assembly is slidably situated between the motherboard 8-7 and the bottom of the dock housing 8-1, and moves forward and back between the limit switches 8-10, 8-11. A flex cable 8-9 connected to the motherboard 8-7 and the tray assembly 8-4 provides power and signal transmission between them.

The embodiment of FIG. 8 has the ramps 8-14 disposed upon the floor of the dock housing 8-1 in the same way and configuration as previously described. The ramps 8-14 perform the same function in both the embodiments of FIGS. 7 and 8.

Figure 9:
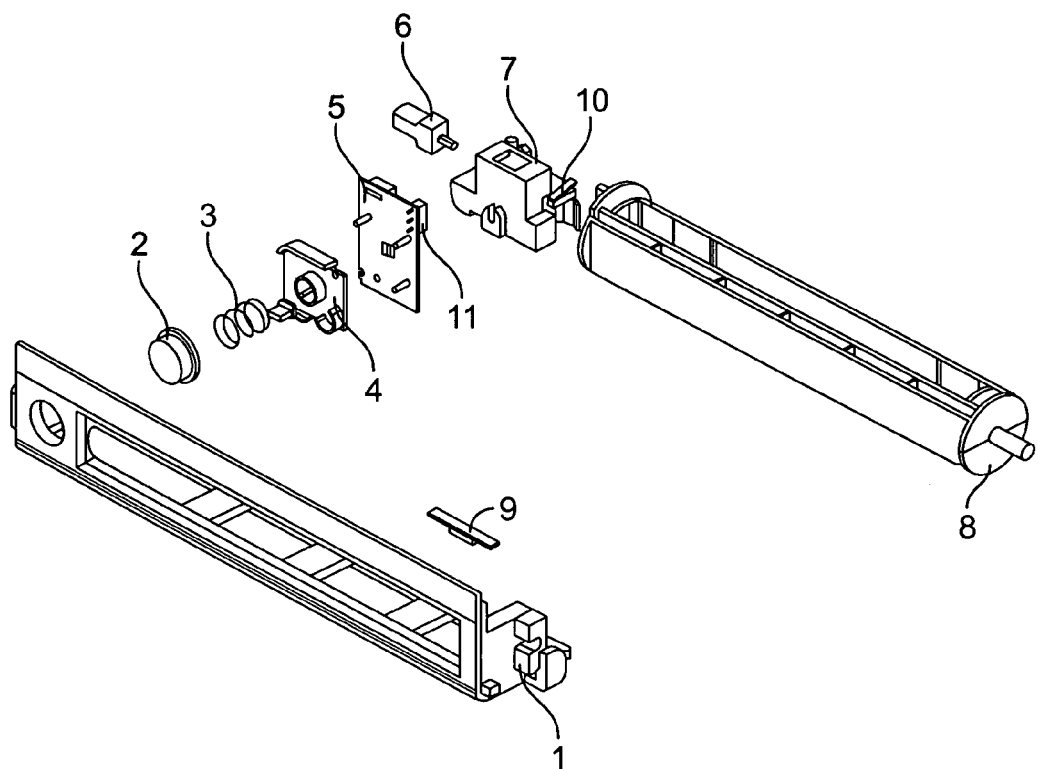
FIG. 9 is an enlarged exploded view of the bay door/front panel subassembly portion of the main dock assembly seen in FIGS. 7 and 8.

FIG. 9 depicts, in an exploded view, principal components of the front panel assemblies 7-2, 8-2 seen in FIGS. 7 and 8, respectively. The front panel assembly of FIG. 9 is shown assembled in FIG. 9A. These front panel assemblies are usable in the embodiments of FIGS. 5A, 5B, and 6A-C. The dock face module 9-1 (corresponding to front panel assemblies 7-2, 8-2) is attached by any suitable means to the front of a dock housing. The module 9-1 substantially closes the front of a dock (e.g., dock 30), and also mounts the bay door assembly and a smart button assembly. The module 9-1 has a generally rectangular bay door aperture completely through the front panel portion, as seen in FIG. 9. The bay door aperture is modestly larger, in width and height dimensions, than the width and height of the system's tablet holder assembly (not seen in FIG. 9, e.g., tablet holder 40 in FIG. 6B); the tablet holder enters and exits the dock housing (7-1, 8-1) via the bay door aperture. The module 9-1 has a flange at a lateral end thereof (right side in FIGS. 9 and 9A), which may be integrally molded therewith. The flange extends rearward from the module. The flange is centrally penetrated by an axle aperture, and has extending from its outside face a notched axle journal. Connected to the back of the module 9-1 is a bay door mounting bracket 9-7. (The bay door mounting bracket 9-7 is at the left side of the face module 9-1 in FIG. 9.) The bay door mounting bracket 9-7 mounts a bay door motor 9-6. The bay door motor's drive shaft preferably is operably connected directly to the left end of the bay door 9-8, so as to support the bay door and impart rotary motion to it when actuated. Alternatively, the bay door mounting bracket 9-7 has a journal means thereon for rotatably supporting the associated end (e.g. an axially projecting axle pin) of the bay door 9-8, and a simple gear train may transmit power from the bay door motor 9-6 to the bay door to open and close it as described herein. Defined through the front panel of the face module 9-1 (on the left side of the panel in FIG. 9) is a (e.g. circular) aperture through which a smart button 9-2 (i.e., corresponding to smart button 32 depicted in FIGS. 5A and 6A) may be accessed, or through which the smart button forwardly protrudes.

Figure 9A:
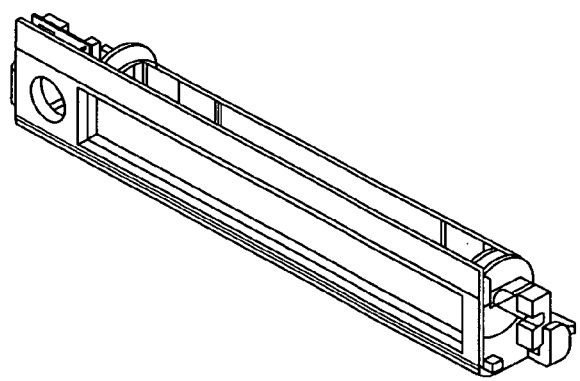
FIG. 9A is an enlarged perspective view of the fully assembled bay door/front panel subassembly seen in FIG. 8.

In a preferred embodiment, the bay door 9-8 is generally cylindrical with a length (the cylinder height) approximately equal to the lateral width of the bay door aperture in the module 9-1. Extending from the right end of the bay door 9-8 is an axle pin, as seen in FIG. 9. The axle pin extends through the axle aperture in the module's right-side terminal flange, and is rotatably disposed in that axle journal. The left end (in FIG. 9) of the bay door is operably engaged with the bay door motor 9-6, and is suitably supported for rotation in cooperation with the motor's drive shaft. The bay door 9-8 is thereby rotatably mounted on and behind the dock face module 9-1. In one embodiment, the bay door defines diametrically therethough a tablet holder slot. The tablet slot has a height corresponding generally to the height of the bay door aperture in the module 9-1 (which in turn is slightly greater than the thickness of the tablet holder). The width of the tablet slot runs nearly the axial length of the bay door 9-8 and approximates in its width the lateral extent of the bay door aperture in the dock face module 9-1. In FIGS. 9 and 9A, the bay door 9-8 is in a "closed" position, so the tablet holder slot is oriented vertically; a solid exterior panel portion of the bay door 9-8 thus faces forward, so that if the bay door were disposed in the module 9-1 without changing their relative positions, the solid panel portion would cover and close the bay door aperture in the module. It is understood from FIG. 9 that rotating the bay door 9-8 ninety degrees may move the door from an open condition (i.e., with the tablet holder slot aligned in orthogonal registration with the bay door aperture) to a closed condition (i.e., with the tablet holder slot oriented parallel to the front panel of the module 9-1), in which the solid exterior panel portion of the bay door 9-8 covers and closes the bay door aperture.

The rotary movement of the bay door 9-8 about its longitudinal axis preferably is controllably powered. A bay door motor 9-6 is attached to the bay door mounting bracket 9-7, and has its drive shaft operably connected with the adjacent end of the bay door 9-8. Controlled actuation of the bay door motor 9-6 accordingly imparts rotary motion to the bay door 9-8. A suitable bay door motor 9-6 is the POLOLU brand motor Model 10951. By regulating the rotation of the bay door 9-8 (for example through a rotation of about ninety degrees, and counter-rotation back again) the bay door may be controllably moved back and forth between the open condition and the closed condition. There preferably is provided in the vicinity of the driven end of the bay door 9-8, proximate to the bay door mounting bracket 9-7, a pair of limit switches for sensing and controlling the position of the bay door. A door open limit switch 9-10 senses when the bay door 9-8 (or a designated portion or thereof or feature thereon) has rotated, under the power of the bay door motor 9-6, into the open condition with the tablet holder slot fully aligned with the bay door aperture. A door closed limit switch 9-11 on or near the bay door mounting bracket 9-7 similarly senses when the bay door 9-8 has rotated into the closed condition with the tablet holder slot parallel to the bay door aperture and a solid portion of the bay door covers that aperture. The limit switches 9-10, 9-11, which may be E-SWITCH brand Model SS0750301F020PIA, are in signal communication with the bay door motor 9-6 via a smart button printed circuit board (PCB) 9-5 and/or the mother board (e.g., 7-7).

The dock face module 9-1 also has disposed on and behind it a smart button assembly. A smart button 9-2 protrudes into a smart button aperture on the front of the module 9-1, where it is exposed for push operation by a user. The smart button 9-2 is mounted to the module 9-1 by means including a smart button printed circuit board (PCB) housing 9-4 that is attached to the dock face module. A smart button spring 9-3 compressibly disposed between the smart button 9-2 and the smart button PCB housing 9-4 gently biases the smart button forward into the smart button aperture in the face of the module 9-1. The smart button in this embodiment thus is capable of slight forward movement by the action of the spring 9-3, and controlled backward movement by the action of a user's finger. The smart button 9-2 is in operable communication with the smart button PCB 9-5, so that a user's pressing of the smart button actuates the smart button PCB to operate the docking station.

In a possible simple embodiment, there is provided any suitable type of switch for controllably interrupting the smart button electrical circuit; for example, there may be an electronic switch in the smart button PCB 9-5. This smart button switch (in the smart button or its directly associated circuitry) is in signal communication (e.g. wireless, such as the BLUETOOTH wireless technology standard) with a master control 20, whereby an operator of the master control 20 can activate the switch thereby to enable/disable the smart button 9-2 to unlock/lock the dock. With the smart button circuit switch open, as regulated by transmission from a master control, an unauthorized user is unable to open the bay door 9-8 by means of the smart button 9-2.

A reed switch printed circuit board (PCB) 9-9 is disposed on the module 9-1, such as on its back, and near the bay door aperture. A suitable reed switch PCB 9-9 is, for example, a COTO brand Model CT10-1030-G4. The reed switch PCB 9-9 is in signal communication with the other PCBs of the docking station, for example via the motherboard in the dock. The reed switch PCB 9-9 is capable of detecting a nearby magnetic field, as from a magnet upon a tablet holder (e.g., holder 40), and signaling that proximity condition to the TDD system to signal, for example, the actuation of the bay door motor 9-6 to move the bay door to an open condition.

Figure 10:
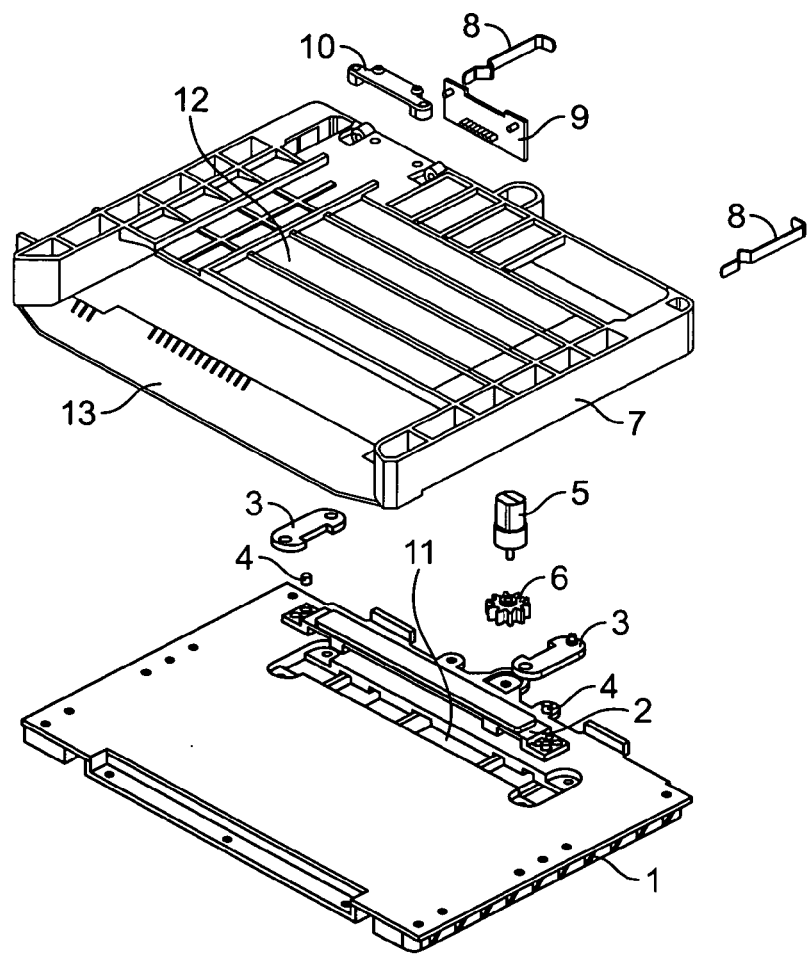
FIG. 10 is an exploded view of a tablet tray subassembly portion of the main dock assembly seen in FIGS. 7 and 8.
Figure 10A:
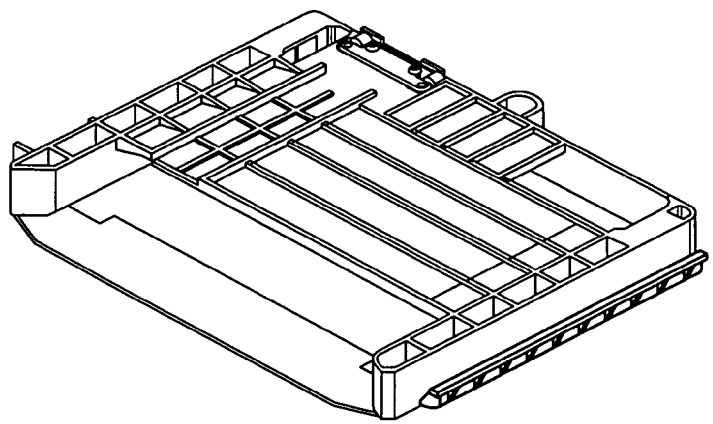
FIG. 10A is an assembled view of a tablet tray subassembly portion of the main dock assembly seen in FIGS. 7 and 8.

FIG. 10 offers, with an exploded view, details regarding the tablet tray assembly (i.e., assemblies 7-4 and 8-4 in FIG. 7 and FIG. 8, respectively) which is movable within the dock housing (i.e., 7-1, 8-1) of a main dock. The main tray assembly is fabricated on the main tray 10-1. FIG. 10A offers a perspective view of the tablet tray assembly when assembled. Fastened above the main tray 10-1 is the tablet tray insert 10-7, which is adapted in size to receive within its hollow interior an inserted tablet holder (not shown in FIG. 10, but seen, e.g., in FIG. 6B as tablet holder 40). The particular configuration of the tray insert 10-7 potentially may be adapted, in a given TDD apparatus, to cooperate with a tablet holder that is customized to hold a selected type or brand or model of tablet computer. The tablet tray insert 10-7 mounts several components which functionally interact with a tablet and tablet holder contained therein. The tray insert 10-7 has a top 10-12 held parallel above a partial bottom 10-13 by a pair of sidewalls. It is seen in FIG. 10, that the tray insert bottom 10-13 is of abbreviated front-to-back extent, being little more than a lateral bridge between the sidewalls, which bridge engages into a lowered ledge on the front of the main tray 10-1. The bottom of the tray insert 10-7 thus preferably is mostly open, or alternatively at least has substantial apertures therein (not visible in FIG. 10, beneath the top 10-12) in the middle and rear portions of the insert. A tablet holder 40 according to this disclosure accordingly is retrievably insertable into the tray assembly, and when inserted is enclosed on the sides by the sidewalls of the insert 10-7, above by the top 10-12 of the insert, and below partially by the front partial bottom 10-13 of the insert, but mostly by the upper surface of the main tray 10-1.

A pair of bendable resilient clip retainers 10-8 are on the inside walls of the insert 10-7, one retainer on each wall on its rearward portion. The clip retainers 10-8 are composed of, for example, a shaped stamped resilient metal. Each clip retainer 10-8 has a projection portion that extends laterally inward toward the central axis of the insert 10-7. Each retainer 10-8 is attached within the insert 10-7 such that its small projecting portions (prong) may flexibly move slightly, under an applied force, toward the insert sidewall upon which the retainer it is mounted, and then elastically rebound (upon the release of the applied force) out from the sidewall to its rest position. Thus, each retainer 10-8 manifests a light spring bias away from its adjacent sidewall. These clip retainers interact with the tablet holder, such as tablet holder 40 of FIG. 6B. The tablet holder has defined in each of its lateral sides a small detent, positioned on the holder to engage with the projecting prong portion of a corresponding retainer 10-8 in the tray insert 10-7. While a tablet holder is being inserted by a user into the tray assembly, the sides of the tablet holder contact the respective clip retainers 10-8 and begin to depress the retainers against their spring bias; the compression of the retainers offers a mild resistance to further insertion of the tablet holder, and provides a tactile feedback to the user that the tablet holder is being properly inserted. When the tablet holder has been fully inserted to its proper position within the tray assembly, the small projecting prong portions on the retainers 10-8 come into registration with the detent notches in the sides of the tablet holder. The retainer prongs are resiliently biased into the tablet holder detent notches, and the resulting "snapping" action provides a tactile feedback to the user that the tablet holder is fully and properly inserted. The engagement of the clip retainer 10-8 prongs into the detents of the tablet holder helps retainer the holder in proper place within the tray. However the holder's detent notches or cavities are so shaped, and the compressive bias force of the clip retainers is sufficiently low, that a user grasping and gently pulling the tablet holder can readily disengage the prongs from the detents to withdraw the holder from the tray insert 10-7.

Also attached upon the tray insert 10-7 is a flex printed circuit board (PCB) bracket 10-10. The flex PCB bracket 10-10 holds in place the flex cable (7-9, 8-9 in FIGS. 7 and 8). As mentioned, the flex cable 7-9, 8-9 provides continuous wired signal communication between the motherboard (7-7 or 8-7) and the tray assembly throughout the tray assembly's forward and backward motions. The motherboard receives a portion of the electrical power delivered to the main dock from an external source (e.g., DC current rectified and stepped down from a conventional 110VAC). A dock connector printed circuit board (PCB) 10-9 is attached directly to the tray insert (or alternatively to the bracket 10-10). The dock connector PCB 10-9 is engageable with a power board PCB (e.g., component 12-4 of the tablet holder in FIG. 12) to provide power and signal communication between the tray assembly and the tablet, via the tablet holder. A tablet holder properly fully inserted into the tray assembly thus has an electronic coupling with the tray assembly, by means of the dock connector PCB 10-9. The tablet's battery thus may charge electrically while the tablet (within the holder) is docked in a docking station.

FIG. 10 also shows that, in an embodiment according to FIG. 7, the tray insert 10-7 has a lug or seat on its back side, and the main tray 10-1 has a platform at the center of its back edge, for mounting the tray motor 10-5 (i.e., component 7-3A in FIG. 7), which motor controllably drives the tray gear 10-6 which extends below the main tray 10-1 for interaction with the rack (7-13 in FIG. 7) as previously explained. Further, the tray insert 10-7 has a mostly open bottom, or at least one relatively large insert aperture defined in its floor, through which a tablet holder lock plate 10-2 can movably project. As further explained hereinafter, the tablet holder lock plate 10-2 can come into registration with an insert aperture or open floor of the tray insert 10-7, extend there-through, and engage with a lock channel in a tablet holder (a holder that is within the tablet tray insert, but not shown in FIG. 10).

The main tray 10-1 has an oblong lock plate aperture 10-11 defined there-through, running laterally across the main tray near its back as seen in FIG. 10. Movably disposed above the lock plate aperture 10-11, substantially vertically aligned with it, is the tablet holder lock plate 10-2. The tablet holder lock plate 10-2 interacts with the ramps (i.e., components 7-14 and 8-14 in FIGS. 7 and 8) and with the tablet holder in a manner to be described further.

The tablet holder lock plate 10-2, along with its functionally associated pair of tablet lock brackets 10-3 and corresponding pair of tablet lock bracket springs 10-4, is situated between the main tray 10-1 and the tray insert 10-7. The holder lock plate 10-2 may nestle in (but with short vertical movement allowed) the complementarily shaped lock plate aperture 10-11 in the top of the main tray 10-1. The lateral ends of the lock plate 10-2 are movably supported in lock bracket seats (visible in FIG. 10, in which tablet lock brackets 10-3 are situated), to prevent the lock plate from falling completely through the lock plate aperture 10-11. The tablet lock bracket springs 10-4 are compressibly disposed between the bottoms of corresponding ones of the tablet lock brackets 10-3 and upper surfaces of the respective lateral ends of the holder lock plate 10-2. The tablet lock brackets 10-3 preferably are fastened to the top of the main tray 10-1 to hold the springs 10-4 in proper place. It is seen, therefore, that the tablet lock bracket springs 10-4 bias downward the holder lock plate 10-2; the holder lock plate 10-2 tends under the action of the springs 10-4 to move down into its complementary recess in the top of the main tray 10-1. However, an upwardly directed force against the bottom of the holder lock plate 10-2 will shift the holder lock plate slightly vertically, against the compression of the tablet lock bracket springs 10-4, up toward and through an insert aperture in, or the substantially open, floor of the tray insert 10-7. The tablet holder lock plate 10-2 accordingly can move a modest vertical distance, up or down, in a space above the main tray 10-1.

The lock plate 10-2 has at least one knob features projecting from its bottom surface (two visible in the embodiment of FIG. 10). The knobs extend down through the lock plate aperture 10-11, and to a point below the bottom of the main tray 10-1, when the lock plate is biased down to its rest position by the force of the lock bracket springs 10-4. These knob features, when extending through the lock plate aperture 10-11, are contactable with the ramps (i.e., 7-14, 8-14) when the tray assembly is moving in the rear portion of the dock.

The tablet tray insert 10-7 is fastened atop the main tray 10-1 substantially to complete the assembly of the tray assembly.

Tablet Holder

A docking station in the TTD system includes a tablet holder. The tablet holder, such as holder 40 seen generally in FIG. 6B, is devised to hold and protect the computer tablet, and to permit functional engagement between the tablet and a dock. The tablet holder preferably is fabricated primarily from a suitably durable and substantially rigid yet resilient material such as high-pressure injection-molded PC/ABS plastic. A tablet holder is configured to enclose and snugly hold an available tablet model, for example and not by way of limitation, a model of an Apple® iPad® tablet. A tablet holder 40 is designed to provide a contained tablet (except its screen) with limited added drop/impact protection and shielding from adverse/abusive conditions. (A preferred embodiment of the tablet holder provides a frame around the edges of a contained tablet, and has a "bottom" that covers the back of the tablet, but optionally may leave the tablet's screen exposed for use.) The exterior of the tablet holder optionally may feature a protruding and/or loop-design handle grab, and/or a finger-grip recess, for easing manipulation (especially removal) of a tablet in relation to its dock.

The tablet holder 40, when fully engaged in the home position within the main dock 30, is in electrical communication with the dock. Signal communication occurs between the holder and the dock. There preferably is a universal power connector for the interconnection between dock and holder. (The location of such connector may need to differ, as differing from tablet to tablet depending upon size, and may require position changes to the dock and the tablet holder for different tablets.)

In a preferred embodiment, a tablet holder is shaped or sized according to concepts generally known, to permit the holder to be inserted, in a single proper orientation, into a complimentarily configured dock aperture, that is, backwards or upside-down insertion is prevented. The lateral sides of the tablet holder may define therein detent recesses, releasably engageable with spring clip retainers in the dock's tray assembly, to provide tactile feedback to the user regarding proper insertion, and for reliable retention of the tablet holder into the tray prior to complete retraction and electrical coupling with the dock. Moreover, the system may be designed such that the bay door of the main dock opens when a tablet holder, having a magnet therein, is brought only into a single proper insertion position in front of the main dock, such that the magnet of selected strength and position activates the reed switch to activate the bay door opening. Thus a magnet preferably is disposed within the tablet holder to electromagnetically interact with a sensor (for example a reed switch) in the dock for detecting and signaling the proximity and proper positioning of the tablet holder to the dock, particularly the dock's bay or aperture.

A tablet holder preferably includes a universal connector for charging tablet batteries and data transmission. In some alternative embodiments, the tablet holder offers the option of charging the tablet "in use," using the tablet manufacturer's power connection, while the tablet is outside its dock. (This in-use charging feature may require a somewhat more complex wiring harness for the holder, and possibly a special switching connector.) In selected alternative embodiments, the back (i.e., the bottom panel when the holder is in a horizontal position) of the tablet holder may be provided with a controllably extendible-collapsible stand for propping the holder in a portrait or landscape tablet use position upon a supporting surface. A status light (possibly redundant to a status light on the associated dock), optionally may be provided on the tablet holder, and which illuminates (to notify the user) when a docking sequence is initiated by a supervisor at a central or master control location.

The tablet holder may incorporate an audio speaker port near the tablet's audio speaker; in one preferred embodiment, the tablet holder is provided with its own dedicated audio board PCB in signal communication with an audio output jack on the tablet for un-muffled communication of audible information from the tablet to the user. If desired, the tablet's audio jack may remain accessible, via a jumper wire, through a port in a corner of the tablet holder. (Although the tablet's speaker may be disabled, on most tablets, if/when this jack is engaged.)

Preferably, the back (bottom) of the tablet holder defines an aperture therein of appropriate size and location to permit use of the tablet's digital camera (in tablets so equipped) while the camera remains within the holder. An O-ring seal may be provided between the tablet holder's top and the front of the tablet, or between the tablet holder top and a screen protector, to resist ingress of fluids to the tablet from accidental spills, etc.

Preferred embodiments of tablet holders include anti-theft features. The tablet holder is designed with tamper-resistant fasteners (e.g., fasteners known in the art and operable only with special tools), and construction to prevent unauthorized removal of the tablet from the tablet holder. But the tablet holder may be opened by authorized personnel to, for example, service the tablet or to change out a tablet screen protector. Also, for example, the interior of a tablet holder may define a space for holding an RFID or other sensor tag (SENSOR-MATIC) for triggering remotely an alarm when the contained tablet is removed from an authorized area or precise location. And, there may be provided within the tablet holder a mechanical switch that opens or closes in the event main parts of the holder housing are opened or separated, as to remove the tablet, without authorization; the switch could, for example, send a signal to alert the supervising user at the master control, or activate some other anti-theft countermeasure. A GPS location sensor optionally may be secured within the tablet holder.

The interiors of different holders may be adapted or customized to receive and hold tablets from different tablet manufacturers, according to respective tablet shapes and sizes. On the other hand, the exteriors of various tablet holders according to this TDD system may have a standard exterior 3-D contour, shape and size, complementary with a single standardized dock. Accordingly it is possible to devise a TDD system that can use a wide variety of tablets in a single standard model of system dock. (Of course, there optionally may be more than one model embodiment of dock according to the present system. In practice, a user has a tablet holder that can be received and accommodated into, and operate with, at least one dock model or embodiment, and care is taken to associate any given tablet holder with a compatible dock to comprise a functional docking station.) Nevertheless, tablet holders according to the present disclosure may be custom-fabricated for use with a single selected make or model of tablet, such as the popular iPad® product. It is within the scope of the invention to provide a tablet holder uniquely configured to a single model of tablet, so as (for example) to maximize identification potential for each tablet; there may be a single holder adapted to the a particular tablet model from APPLE, MICROSOFT, GOOGLE, ASUS, and the like.

Any tablet may thus be retained within an appropriately corresponding tablet holder (e.g., holder 40), permitting the tablet to be functionally engageable with the dock (e.g., 30) in a docking station of the TDD system. A wide variety of differing tablets thus be accommodated into a standard dock, or a modest number of different docks, in a TDD system. It is anticipated, though, that a single inflexible configuration for the tablet holder is generally impractical, given the diversity of current and future tablet shapes and sizes. Rather, the tablet holder can be devised to be versatile and at least somewhat "future proof;" manufacturing molds for tablet holders according to the invention may be provided with swappable internal mold core designs, or removably insertable inserts, to accommodate yet-to-be developed tablet models (in the absence of major changes to tablet size/shape).

The tablet holder preferably is provided with universal-type power connectors/contacts for coupling electrically the tablet holder with its associated enclosed tablet. The location of such points of coupling may differ amongst various tablet models; the tablet holder preferably employs flexible power and/or signal transmission tethers to promote versatility of utility amongst tablet models.

Figure 11A:
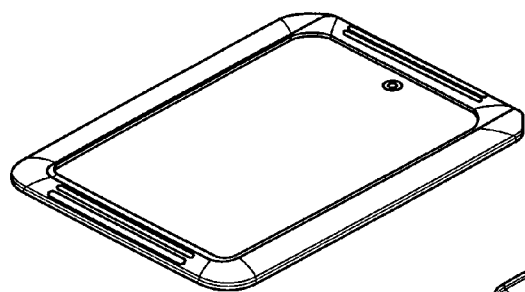
FIG. 11A is a top view of the tablet holder assembly seen in FIG. 11, assembled according to the present disclosure.

Attention is invited to FIGS. 11, 11A, 11B, and 12, illustrating details of a possible embodiment of the overall tablet holder 40 according to the present disclosure. When fully assembled for use, the tablet holder, holding and containing a portable computer tablet 11-2, appears as seen in FIG. 11A. Fundamentally, the tablet holder serves to hold and contain the tablet, and to provide the means by which the contained tablet interfaces and engages with the tray assembly and dock. The tablet holder may be fabricated primarily from a suitably durable material, such as plastic, although it also includes certain simple electronic elements. As suggested by FIG. 11 the tablet holder bottom assembly 11-1 assembly of the holder is provided with a plurality of lugs or holes for receiving fasteners and correspondingly aligned holes or lugs in the tablet holder top whereby the holder bottom and top 11-4 are secured together in a tamper-proof manner.

Figure 11B:
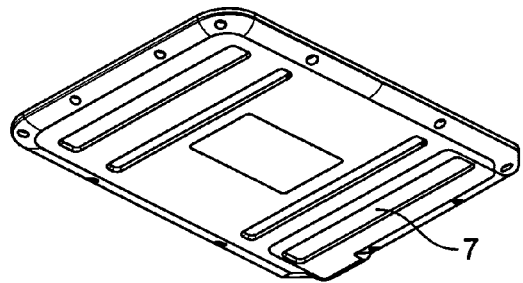
FIG. 11B is a bottom view of the bottom tablet assembly portion of the tablet holder assembly seen in FIG. 11.

The tablet holder includes as principle components a bottom tablet assembly 11-1 aligned and fastened together with a tablet holder top 11-4. The tablet 11-2 to be held and contained, and utilized at the docking station, is securely sandwiched between the tablet holder top 11-4 and the bottom tablet assembly 11-1 as suggested by FIG. 11. The O-ring 11-3 is situated outside the periphery of the tablet 11-2, and is compressed between the outside frame portions of the tablet holder top 11-4 and the bottom tablet assembly 11-1, to sealably protect against the ingress or leakage of fluids. The O-ring 11-3 also may provide some padded cushioning between the tablet holder top 11-4 and the bottom tablet assembly 11-1. A power tether 11-5 provides electrical communication between a conventional port or socket in the tablet 11-2 and a power board printed circuit board (i.e., component 12-4 in FIG. 12) in the tablet holder. The tablet holder's power printed circuit board 12-4 features a connection port engageable with the dock connector 10-9 of the tray assembly, whereby a tablet holder 40 may be electrically connected to the tray assembly. The audio tether 11-6 supplies means for audio signal communication between an audio jack or other audio signal output on the tablet 11-2 and an associated audio output assembly in the tablet holder. FIG. 11B is a perspective view of the bottom underside of the tablet holder bottom assembly 11-1. There is defined in or through the bottom tablet assembly 11-1 a lock slot or channel 11-7. The lock channel 11-7 is shaped generally complementarily to, but is sized slightly larger than, the tablet holder lock plate (i.e., 10-2 in FIG. 10), such that the tablet holder lock plate can be engaged into and withdrawn out of the tablet holder's lock channel 11-7.

Thus the tablet holder top and the bottom tablet assembly are shaped and sized so as to surround and snuggly contain a given model of computer tablet. The tablet holder top and the bottom tablet assembly are placed into registration and brought together and fastened as suggested by FIG. 11; preferably the junction between them is sealed by means of a the suitably resilient O-ring type gasket. Not clearly seen in FIG. 11, but nevertheless defined in each lateral side of the tablet bottom assembly 11-1, is a detent notch or cavity, so located on the tablet assembly so as to engageably receive the dimple or prong portion of a corresponding clip retainer (10-8 in FIG. 10) in the tray insert 10-7 when the tablet holder is fully inserted in the trays assembly, as described previously herein.

Figure 12A:
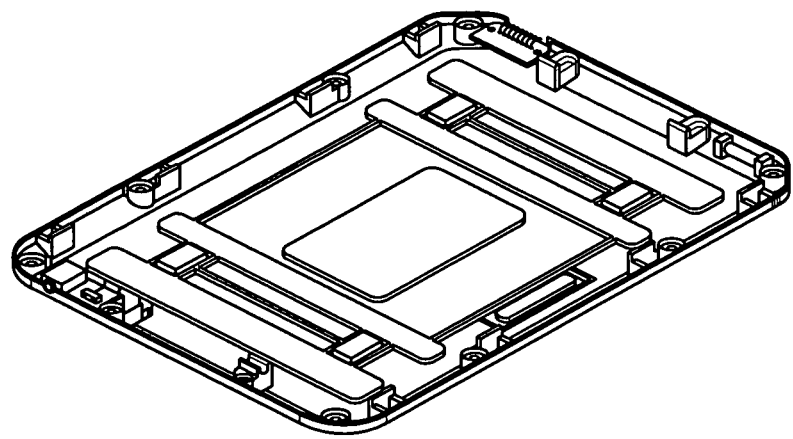
FIG. 12A is an assembled view of the bottom tablet assembly portion of the tablet holder seen in FIG. 11.

Attention also is invited to FIGS. 12 and 12A, showing added features of the tablet holder, on the bottom tablet assembly 12-1 (corresponding to the bottom tablet assembly 11-1 of FIG. 11). There may be provided within the bottom tablet assembly at least one, but more typically a plurality, of bumper pads 12-5 disposable between the side walls of the bottom tablet assembly and the sides of the computer tablet for padding and/or securing the tablet within the holder. The interior bottom of the bottom tablet assembly 12-1 preferably is molded with suitable reinforcing ribs, and may also have defined therein pockets and recesses for receiving and holding various subcomponents according to this disclosure. For example, there may be defined a recess in bottom tablet assembly a defined recess or pocket for receiving and holding securely an optional sensor/ID theft tag 12-7 (e.g., an RFID tag). There also may be disposed in the bottom tablet assembly 12-1 at least one detection magnet 12-6, such as a HAMLIN brand permanent magnet Model 625, which permits the reed switch (9-9 in FIG. 9) on the main dock's dock face module (i.e., 9-1 in FIG. 9) to sense the proximity of the tablet holder.

The tablet holder may have, in the inside of the bottom tablet assembly 12-1, an audio board printed circuit board (PCB) 12-2 in cooperation with an audio jack 12-3 (for example a SWITCHCRAFT jack Model 35RAPC4BHN2). The audio board PCB 12-2 is in signal communication with the computer tablet via the suitable audio tether (11-6 in FIG. 11). The audio tether 11-6 engages into an audio microphone port of the tablet. The audio board PCB 12-2 thus permits audio to be broadcast to the user from the contained tablet (11-2 in FIG. 11) (without interference from the tablet holder), from a small speaker at the audio board PCB. A power printed circuit board 12-4 also is provided in a suitable recess or other seat within the bottom tablet assembly 12-1. The power PCB 12-4 has a port portion or connection that is accessible at the exterior of the bottom tablet assembly 12-1, so that the tablet holder when assembled can be coupled into electrical connection with a power source in the docking station. Power PCB 12-4 is in operational connection with a power port of the tablet via the suitable power tether (11-5 in FIG. 11). Accordingly, power can be delivered to the tablet 11-2 via the tablet holder and power tether 11-5. A lock channel 12-8, corresponding to channel 11-7 in FIG. 11, is visible in FIG. 12. The tablet holder lock plate (10-2 in FIG. 10) can move into the lock channel 12-8 to lock the tablet holder within the tray assembly of FIG. 10.

Combined reference to FIGS. 7, 10, and 11 discloses how the motor-driven movement of the tray assembly backward (to "tray back" or home/docked position) and forward (to "tray forward" or out position) within the main dock (i.e., dock 7-1) automatically mechanically locks and unlocks, respectively, the tablet holder assembly within the main dock. While the tray assembly, bearing therein a tablet holder, is translating rearward under the controlled power of the tray motor, the tablet holder lock plate 10-2 is held in its rest (fully down) position by the tablet lock bracket springs 10-4. When the lock plate 10-2 is in the rest position, the knob features on its bottom extend a short distance down through the lock plate aperture 10-11, allowing the knobs to come into contact with the ramps 7-14.

Continued rearward movement of the tray assembly brings the bottom surface (more specifically the plate's underside knob features) on the lock plate 10-2 into contact with the tapered/inclined ramp(s) 7-14. The tray assembly continues moving rearward, and the lock plate's knob features slidably "ride" progressively up the front inclined edges of the ramps 7-14. As the effective height of the inclined ramps 7-14 increases relative to the moving tray assembly, the ramps push up against the bottom of the lock plate 10-2, against the urging of the tablet lock bracket springs 10-4. As the tray assembly translates toward the home position, the lock bracket springs 10-4 are compressed between the ends of the holder lock plate 10-2 and the lock brackets 10-3; as the springs are overcome, the lock plate 10-2 is shifted vertically upward. The lock plate 10-2 ultimately moves up enough to project up through an opening in the tray insert 10-7. When the tray assembly has moved nearly to its home position in the dock 7-1, the lock plate knobs have reached, and are in sliding contact with, the tallest portions of the ramps 7-14, and the lock plate 10-2 is pushed to its maximum height displacement.

As the lock plate 10-2 is shifting up to its maximum height in relation to the floor of the dock 7-1, it concurrently moves up into engagement into a corresponding lock slot or channel 11-7 in the exterior bottom of the bottom tablet assembly 11-1. By the time the tray assembly obtains the home position in the dock, the tablet holder lock plate 10-2 is fully engaged with the tablet holder's lock channel 11-7, thereby securely interlocking the tablet holder and the tray assembly. So long as the tray assembly is at the rearward-most home position within the dock 7-1, the uppermost edges of the ramps 7-14 hold the holder lock plate 10-2 in locked position extending through the bottom of the tray insert 10-7 and into the lock channel 11-7 in the tablet holder assembly bottom 11-1.

The unlocking of the tablet holder from the tray assembly is accomplished by reversing the foregoing process. The tray motor is actuated into reverse to drive the tray assembly forward out of the home position and toward the front of the dock 7-1. While the tray assembly, bearing the tablet holder, is translating forward under the controlled power of the tray motor, the tablet holder lock plate 10-2 is held in its maximal up position (engaged in the tablet holder's lock channel 11-7) by the topmost surfaces of the ramps 7-14. The knobs on the underside of the lock plate 10-2 are in sliding contact with the top most surfaces of the ramps 7-14.

Continued forward movement of the tray assembly brings the underside knob features on the lock plate 10-2 into contact with the tapered/inclined front edges of the ramp(s) 7-14. The tray assembly continues moving forward, and the lock plate's knob features slidably "ride" progressively down the front inclined edges of the ramps 7-14. As the effective height of the inclined ramps 7-14 decreases relative to the moving tray assembly, the lock plate 10-2 moves down by the action of the tablet lock bracket springs 10-4. As the tray assembly translates toward the tray forward position, the lock bracket springs 10-4 are decompressed between the ends of the holder lock plate 10-2 and the lock brackets 10-3; as the springs release, and the knobs on the underside of the lock plate 10-2 slide smoothly down the inclined front edges of the ramps 7-14, and the holder lock plate shifts vertically downward. Due to the forward movement of the tray assembly, the lock plate 10-2 ultimately moves down enough (as biased by the tablet lock bracket springs 10-4) to descend through the open bottom of the tray insert 10-7. By the time the tray assembly has moved mostly to its forward-most position in the dock 7-1, the lock plate knobs are no longer in sliding contact the ramps 7-14, and the lock plate 10-2 is pushed by the springs 10-4 to its rest position in the main tray 10-1.

As the lock plate 10-2 thereby is shifting down through the opening in the bottom of the tray insert and to its rest position in relation to the floor of the dock 7-1, it concurrently disengages from the lock channel 11-7 in the exterior bottom of the bottom tablet assembly 11-1. By the time the tray assembly reaches the "tray forward" position in the dock, the tablet holder lock plate 10-2 is fully disengaged from the tablet holder's lock channel 11-7, thereby releasing the tablet holder, and freeing it for manual removal from the tray assembly. So long as the tray assembly is at the tray forward position within the dock 7-1, the lock bracket springs 10-4 hold the holder lock plate 10-2 in the unlocked rest position in the main tray 10-1, so that it does not extend through the bottom of the tray insert and up toward the tablet holder. With the lock plate 10-2 in its rest position, the tablet holder is freely insertable into, and removable from, the tray assembly.

Undocking-Docking Sequences

System operation includes methods for a preferred docking sequence and an undocking sequence, permitting a supervisor to regulate the storage and use of one or more tablets.

Basic Version Docking and Undocking

In a basic version of the system, one or more main docks 30 are controlled from a master control, which may be the control 20 seen in FIG. 5A. The master control is in signal communication (preferably but not necessarily wireless) with its operatively associated dock(s) 30. (Description of one dock 30 serves to describe all in a collected system.) In this embodiment, the dock's indicator light 34 displays in four modes: solid green, flashing green, amber, or red. The light 34 receives signals as herein descript to indicate whether the tablet holder 40 (with tablet) is docked within the dock 30 or not, whether the tablet is charging, and whether the docking station is "locked" so that only qualified persons can activate the dock to eject the tablet holder. When the tablet holder is fully docked, the station is unlocked, and the tablet's batteries are charged, the indicator light 34 on the station dock 30 displays a steady continuous green. If the tablet holder 40 is not in the dock 30, the indicator light displays a continuous amber color (immediately notifying a supervisor that the associated tablet is not docked). When the tablet holder is fully docked within the dock 30, and the station is unlocked, but the tablet batteries are charging via the docking station, the indicator light 34 blinks green (e.g., by an sine pulse type at about one second). When the station is locked (e.g., to prevent actuation by the smart button 32), the indicator light 34 displays a continuous red color.

If a tablet is present within the dock 30, and the dock is locked, the indicator will initially display red, and will continue to do so until the master control 20 is activated to unlock the dock 30. When the dock is locked, the smart button 32 is deactivated (e.g., by the interruption of the circuit connecting it to the smart button PCB), and pressing it will not actuate the dock to eject the tablet and tablet holder 40; rather, the tablet remains secured within the dock 30.

A typical undocking sequence in this basic embodiment of the system may commence with a dock 30 in a locked condition and the tablet holder 40 retained therein. The indicator light 34 is red in color. The supervisor presses the unlock button 28 on the remote master control 20, which sends a signal to an antenna in the smart button circuit of the dock, closing the circuit and enabling the smart button 32. The indicator light 34 changes color to green or blinking green (depending upon the tablet's charging status), indicating to the user that a tablet is available and the smart button 32 may be manually operated. The user then manually presses the smart button 32, which activates the control circuitry and bay door and tablet tray assemblies, previously described, to open the bay door 9-8 and move forward the tablet tray assembly 8-4. The tablet holder thus is presented (e.g., FIG. 6C), and the user grasps it and removes it from the dock 30 for use. The indicator light 34 changes color to amber, notifying of an "empty" dock. The supervisor may either leave the dock in an unlocked condition, or may lock it by depressing the lock button 28 on the master control 20. If the supervisor elects to depress the lock button 28 while the tablet holder is outside the dock, the smart button circuit is opened and the smart button is disabled. The indicator light 34 remains amber until the tablet holder is re-inserted and restored to the fully docked condition, when the indicator light changes to red.

At the selected or indicated time, the user may initiate a docking sequence in order to restore the tablet holder 40 (with tablet) to the dock 30. Whether or not the dock 30 has been locked, while the tablet is outside the dock the indicator light 34 displays amber. To initiate a docking sequence, the user preferably brings the tablet holder 40 into correct orientation in front of, and aligned properly with, the bay door aperture, thereby triggering the reed switch PCB 9-9, which opens the bay door 9-8 and presents the tablet tray assembly 8-4. The user inserts the tablet holder 40 into the tablet tray assembly, which assembly withdraws into the dock housing, followed by the closing of the bay door and the securing of the tablet in the dock 30. The indicator light 34 then changes from amber to green (if the station is unlocked) or from amber to red (if the supervisor previously locked the dock while the tablet holder was outside the dock). If the station was in the unlocked condition at the time of tablet holder insertion (i.e., the supervisor had not pressed the lock button 26 while the tablet was outside the dock), the supervisor may then press the lock button, which signals the disabling of the smart button 32, followed by the changing of the indicator light 34 from green (steady or blinking) to red. The tablet holder 40 is thereby locked within the dock 30. With the smart button disabled, the sole way for a user to re-initiate an unlock sequence, and thus obtain access to a tablet, is to await the depression of the unlock button 28 in the hands of an authorized supervisor.

In one version of this basic embodiment, the only way for a user to open the dock's bay door 9-8 (without accessing the master control 20) when the tablet holder 40 is outside the dock 30 is to actuate the reed switch PCB 9-9 by bringing the tablet holder into the predetermined proper insertion position outside the bay door. Alternatively, the system may be designed such that a user also can open the bay door 9-8, with the tablet holder outside the dock 30, by depressing the smart button 32, provided that the station has not previously been locked by means of the master control 20. It may be preferable especially in institutional settings to prevent a user from being able to open the bay door 9-8 by means of the smart button 32 when his or her associated tablet is outside the dock 30 (i.e., in use or held by the user). In all embodiments, the only way a user can open the bay door 9-8 to obtain access to a tablet secured within a dock 30 is by awaiting the enablement of the smart button 32 by means of a signal from the master control 20 (by actuation of the unlock button 28). If a tablet holder 40 is within the dock 30 and the dock has been locked, the indicator light is red and an unauthorized user cannot eject the tablet by means of pushing the smart button 32.

It is possible, if desired, to provide a dipswitch or other switching device in a secured location within the dock 30, whereby the docking station can be converted to a "stand alone" version. In such a stand-alone version, there is no master control 20 required or used. The toggling of the switch alters the dock circuitry such that the opening and closing of the bay door and the movement forward and back of the tablet tray assembly in the dock 30 is initiated solely by the operation of the smart button 32 and/or the activation of the reed switch PCB 9-9. A stand-alone version of the TDD system offers charging and environmental protection for the tablet, but nearly no security against unauthorized use or theft.

Alternative Linked or Complex Version Docking and Undocking

Figure 13A:
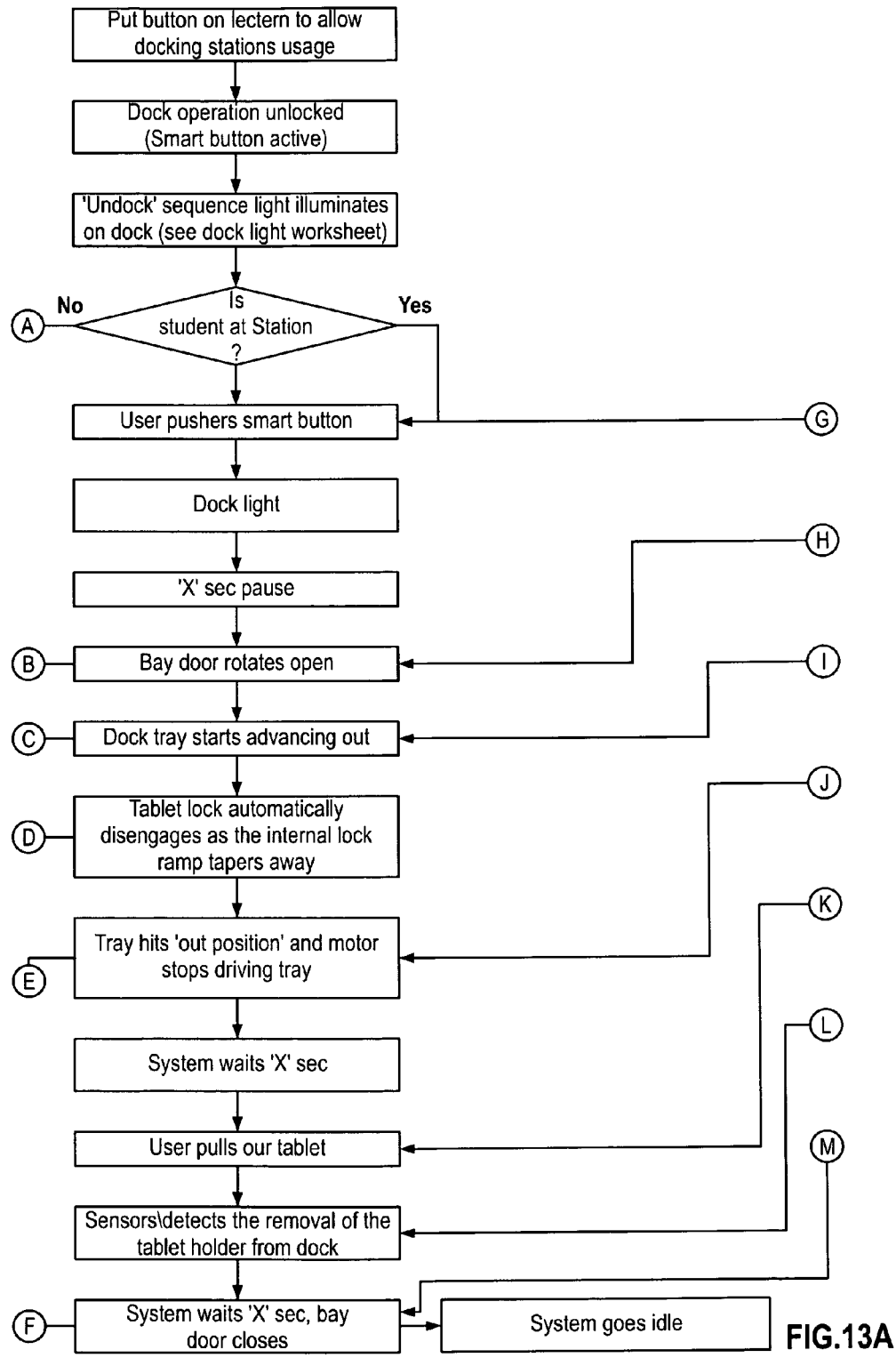
FIG. 13A is the first portion of a flowchart diagramming a possible preferred undock sequence and methodology for an apparatus and system according to the present disclosure; designations A-F in this figure indicate the continuation of this flowchart on FIG. 13B, and designations G-M in this figure indicate the continuation of this flowchart on FIG. 13C.
Figure 13B:
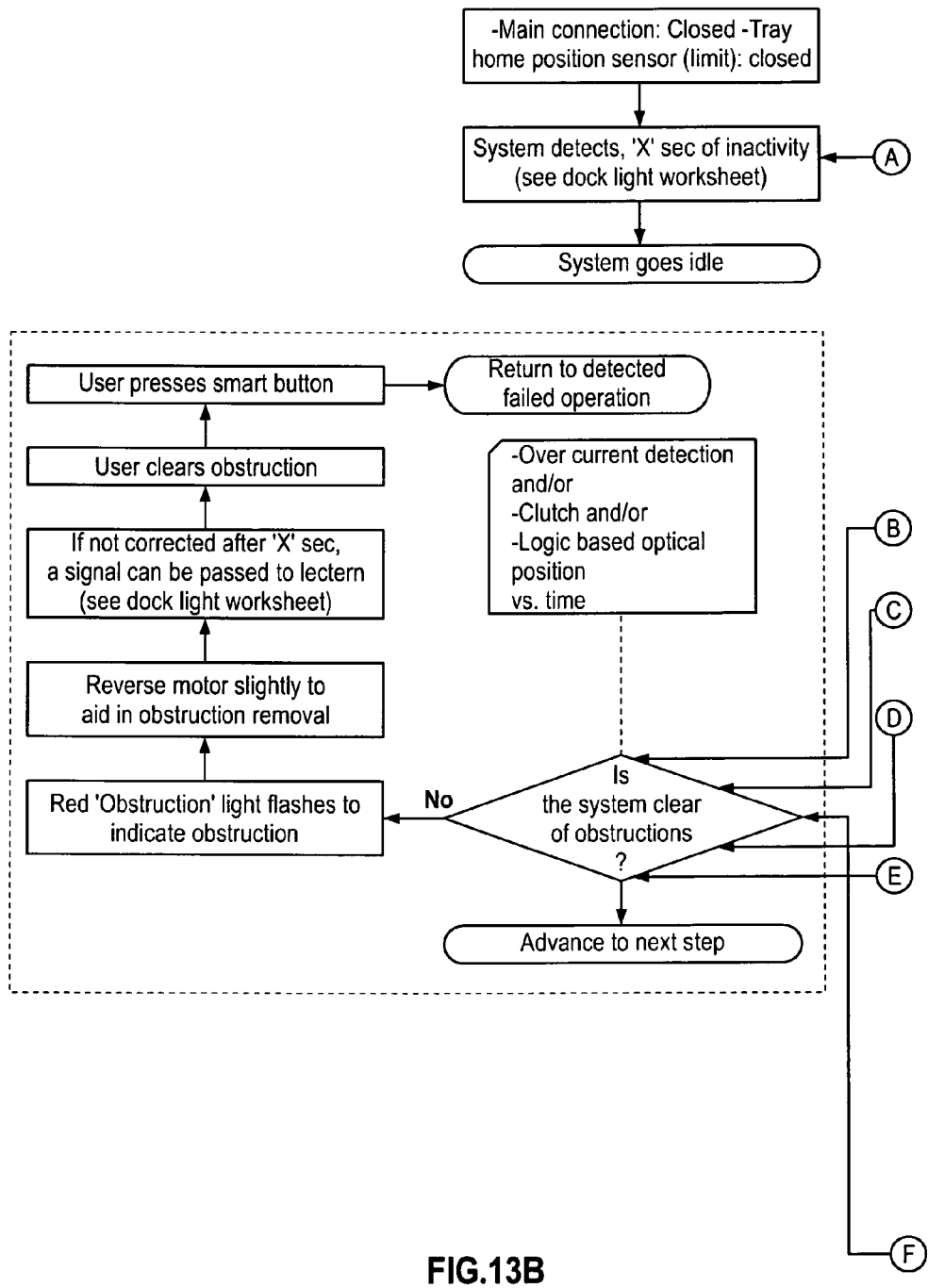
FIG. 13B is a first continuation of the flowchart depicted in FIG. 13A, with designations A-F in this figure corresponding to designations A-F in FIG. 13A.
Figure 13C:
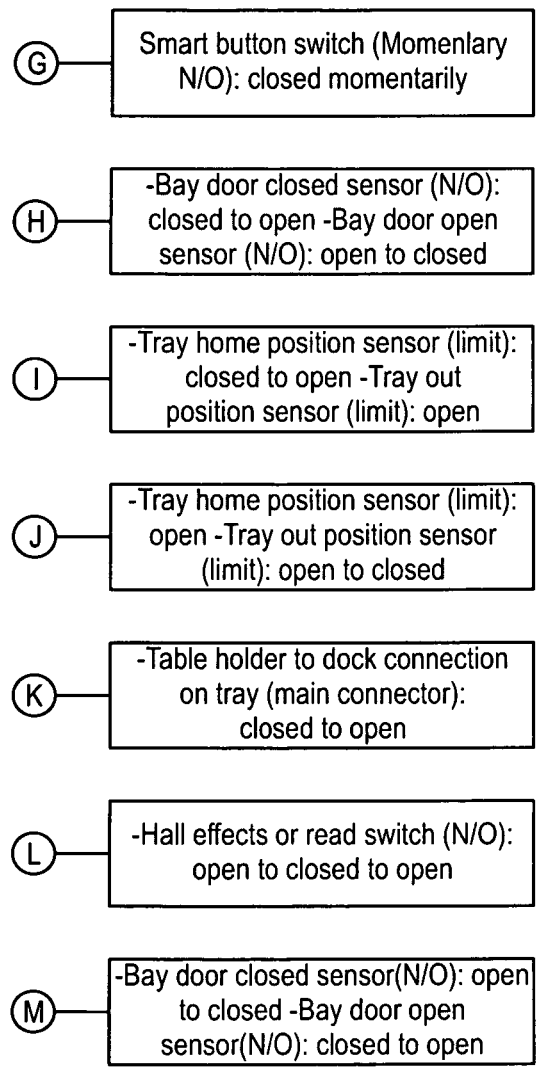
FIG. 13C is a second continuation of the flowchart depicted in FIG. 13A, with designations G-M in this figure corresponding to designations G-M in FIG. 13A.

Reference is made to FIGS. 13A thorough 13C diagramming a possible undocking sequence in a linked/networked system (e.g., as seen in FIG. 1).

In a linked embodiment, the system includes at least one, typically a plurality, of docking stations situated in, for example, a classroom or lecture hall. Each docking station has a dock 30 capable of receiving a corresponding tablet holder 40, and each tablet holder is devised to hold an associated tablet. The master control 20 is at a supervisory location, for example, at a classroom lectern. The docking stations are in intercommunication with the master control. Motherboard PCBs integrated in the TDD system are programmed, generally in according to knowledge within the programming arts, to provide logic for command and control function in the system. Description hereafter of the operation of the TDD system with respect to one docking station in the system serves to describe how the system may operate with respect to any other docking station in a system incorporating a plurality of stations.

At the outset, a TDD system not in use is in a stand-by mode. When the system is on stand-by, each docking station is in stand-by and "locked," that is, physically secured closed so as to prevent access to the tablet holder contained therein. One or more status light(s) (e.g., an indicator light 34) at each docking station maintains an unvarying relatively dim intensity (e.g. 5-20% brightness) to indicate that the station is potentially operable, but in stand-by mode with the system. The status light may be for example a green or multicolor LED, that when illuminated is seen through a clear plastic cover or light-pipe such as on the dock of the docking station.

Operation of a multi-station system is initiated by a supervisor operating a first master control button or unlock button to turn the system "on" and into an unlocked initiation mode. Operation of the first lectern button sends an unlock signal to the docking stations to allow their individual use. A station's receipt of the unlock signal from the master control activates electronically the smart button on the docking station. The smart button optionally is a momentary (default open) tactile switch. A smart button, so activated, may be operated during the unlocked initiation mode by a user at the station to unlock physically the dock to access the tablet. Conversely, a smart button that has not received an unlock signal is not activated, and cannot be operated during unlocked initiation mode to physically unlock the dock.

Upon the docking station's receipt of the unlock signal, the status light increases in brightness, and begins flashing or blinking to alert a user that the system is in the unlocked initiation mode and that the smart button is operable for an available alert time. The status light at the station flashes or blinks slowly (e.g., at 100% intensity) for a predetermined time (e.g., about 5-10 seconds), during which time the user at the station, if the user intends to use the tablet therein, should operate the station's smart button. Optionally but preferably, the unlocked initiation mode is followed immediately by an unlocked ready mode lasting, for example, about 20 seconds, during which the status light is illuminated at a full steady brightness to indicate that the station smart button remains activated, but also warning that time is lapsing for operation of the smart button. In the basic preferred embodiment, the available alert time for operating the smart button thus may be about 5-10 seconds, corresponding generally to the time period of the unlocked initiation mode. In the optional alternative embodiment, the available alert time for operating the smart button may be up to about 30 seconds, corresponding generally to the combined durations of the unlocked initiation mode and the unlocked ready mode.

If there is no user at the particular docking station, or if the user elects not to use the tablet, the TDD system detects that the smart button has not been pushed during the available alert time. This timed inactivity of the docking station (i.e., the smart button has not been pushed during the available alert time), is detected by the TDD system. The TDD system then signals to the inactive docking station to go into an "idle" or unlocked stand-by mode. When the docking station is switched to unlocked stand-by mode, the main connection between the tablet holder and dock is closed, and the tray home position limit sensor (tray back limit switch) in the dock at that station also remains closed. The bay door on the dock accordingly does not open, while the status light ceases blinking and dims to a constant reduced brightness (for example, 5%-20% brightness), and the docking station remains physically locked against use. For so long is the overall TDD system is on, the status light on a docking station in such idle mode remains dimmed and unvarying.

If a user at a station desires access to the tablet, the user operates the smart button within the available alert time, e.g., by pressing the smart button. A smart button switch (momentary, normally open (N/O) in communication with the smart button is closed momentarily, and signals the actuation of the dock's bay door. There may follow a brief timed (for example a few seconds) pause, and the dock's bay door opens. The opening of the bay door is sensed by a bay door closed sensor (N/O) (i.e., bay door closed limit switch) in the dock, which bay door closed sensor changes from "closed" to "open" sensed condition. Contemporaneously with this shifting condition of the bay door closed sensor, a bay door open sensor (bay door open limit switch) in the dock changes from "open" to "closed" sensed condition. The bay door may require a second or two to open mechanically.

Pushing the smart button actuates the opening mechanisms (bay door opening, tablet tray motion) of the dock itself. The opening of the dock bay door marks the commencement of the system's ejecting mode. During the ejecting mode, the tablet tray assembly advances, from its storage or "home" position in the main dock body, to a ready, forward, or "out" position, at which position the tablet is presented for use. The movement of the tray assembly from the dock body preferably is driven by the gear motor and rack-and-pinion, with a clutch and/or over-current protection. During ejecting mode, the status light blinks at full brightness while the tablet tray assembly moves forward in the main dock body. The ejecting mode typically has a relatively short duration of, for example, 1-4 seconds. At the completion of the ejecting mode, the tablet tray assembly is maximally forward in the dock to allow the user to grasp and remove the tablet holder therein. There is provided in the preferred embodiment, however, a means for detecting an obstruction in the operation of the docking station during ejection mode.

Preferably, within the dock there are means for detecting if/when the operation of the bay door, and/or the movement of the tablet tray assembly, is arrested by an obstructing item at or near the bay door aperture. The means for detecting an obstruction may be one or a combination of several techniques, known generally in the art and adaptable for use in the TDD system. For example, the tablet tray assembly motor circuit (and/or the bay door motor circuit) may be provided with an over-current detector, which senses the elevated current resulting from an "over-worked" motor. Alternatively, there may be provided a mechanical clutch with sensor, or electromechanical clutch means, for sensing a predetermined, unacceptable, slippage in the motor drive assembly for the tablet tray or the bay door. In a more sophisticated embodiment, obstruction detection means may be a logic-based system for evaluating (e.g., optically) the movement of the tablet tray assembly versus elapsed time; in the event the tray assembly stops moving (or its movement is retarded) for a predetermined unacceptable period of time, the system assumes that an obstruction of the tray assembly has occurred.

In the event an obstruction is detected, the system changes to a jam error mode. At the beginning of the jam error mode, the system generates a signal to trigger a flashing red obstruction status light at the docking station, or to switch the status light to a flashing red condition, to alert the user to the obstructed condition of the docking station. A timer optionally may be initiated to measure the jam time during which the docking station is in jam error mode. In the event the obstruction is not removed in a timely manner (e.g., 5-10 seconds), and the measured jam time exceeds a predetermined time limit, the system transmits a signal to the master control (e.g., at the lectern) to permit intervention (and attempted remediation) by the supervisor.

The obstruction/status light flashes until such time as the obstruction is cleared and normal functioning of the docking station has resumed. Substantially concurrently with the actuation of the flashing red obstruction/status light, the operation of the drive motor(s) for the tablet tray assembly (and preferably the bay door drive motor) automatically is reversed slightly to aid the user in removing the detected obstruction. After a short reversal of a drive motor, in a preferred embodiment the power current to the drive motor then may be paused, stopping the motor pending removal of the obstruction and the restarting of the station operation. If the obstructed condition of the docking station is not corrected be the expiration of the jam time limit, the affected docking station may need to be deactivated to await further servicing by a qualified technician.

Most typically, the user proceeds to clear the obstruction, and ordinarily will do so successfully prior to the expiration of the jam time limit. After the user clears the obstruction, she again operates the smart button at the docking station. Operation of the smart button subsequent to obstruction detection (and expiration of the jam time limit) resets the docking station, and returns the undocking sequence to the process point when the obstruction was originally detected, ordinarily either to either restart the bay door motor to open the bay door, or to restart the tablet tray assembly drive motor to recommence the movement of the tray assembly from within the dock.

During the ejecting mode of the station's function, the tablet tray moves forward from its home position. The first movement from the home position is detected by a tray home position sensor, the tray back limit switch which then changes from a closed to an open sensed condition.

Also in communication with the tray assembly is a "tray forward" position sensor or limit switch, which is in an open sensed condition when the tray assembly is in home position, and which remains in such condition until the conclusion of the ejecting mode.

As the tray assembly moves from its home position toward its forward position during the ejecting mode, the tablet lock (tablet holder lock plate and dock ramp assemblies) automatically disengages as the internal lock ramp tapers away.

The motor-driven rack-and-pinion moves the tray through its predetermined range of motion, until it reaches the out or forward position. When the tray assembly obtains this forward position, such position is detected by the tray forward limit switch, which changes from an open sensed condition to a closed sensed condition. A signal is sent to the tray assembly drive motor to stop its driving action (e.g., by powering it off). Optionally but preferably, the station may then enter a "tablet ready" mode, during which the tray assembly is forward in the dock and the tablet is available for use. During the tablet ready mode the status light is signaled to increase in steady brightness, e.g., from about 5% to 20% brightness to about 80% to 100% brightness. The tray assembly remains forward at least until the tablet holder is removed from the tray by the user.

At the conclusion of the ejection mode (after any detected obstruction is removed and the docking station reset by the user, if necessary), the tray assembly is at its forward position, allowing access to the tablet by the user. The user is able to grasp the tablet holder containing the tablet, and remove the tablet holder from the tablet tray. The user's removal of the tablet holder commences the "idle while tablet out" mode of the station. Removal of the tablet holder disengages the tablet holder from the tray assembly, and terminates the electrical connection between the tablet holder and the tray (the tray assembly being, of course, a subassembly of the dock). The tablet-holder-to-dock electrical connection accordingly is opened. (In those alternative embodiments featuring a "tablet ready" mode, the disengagement of the tablet holder from the dock triggers a change in the steady brightness of the status light, dimming it to 5%-20% brightness. In basic embodiments lacking an indicated "tablet ready" mode the constant, dimmed brightness of the status light is unchanged from the unlocked stand-by mode to the idle while tablet out mode.

The physical removal of the distal end of the tablet holder from the dock triggers the reed switch in the front panel assembly of the dock. Alternatively, such removal actuates a Hall Effect sensor in the front panel assembly of the dock. Regardless of the removal detection means employed, this detection means changes from an open to a closed and then an open sensed condition, which transmits a signal to the system to time a predetermined delay (e.g., several seconds) before signaling the actuation of the bay door drive motor to close the bay door. When the bay door has closed, the bay door closed sensor changes from an open sensed condition to a closed sensed condition, while the bay door open sensor conversely but substantially simultaneously changes from closed to open. In the event the bay door is prevented from closing by an obstruction, its associated obstruction detection means is activated and the obstruction detection/removal routine and protocol is commenced to prevent damage to the bay door motor drive assembly. Upon the successful closure of the bay door, the station enters the idle while tablet out mode, which lasts indefinitely until the docking sequence is commenced to permit the tablet holder (with tablet) to be re-inserted into the docking station.

Figure 14A:
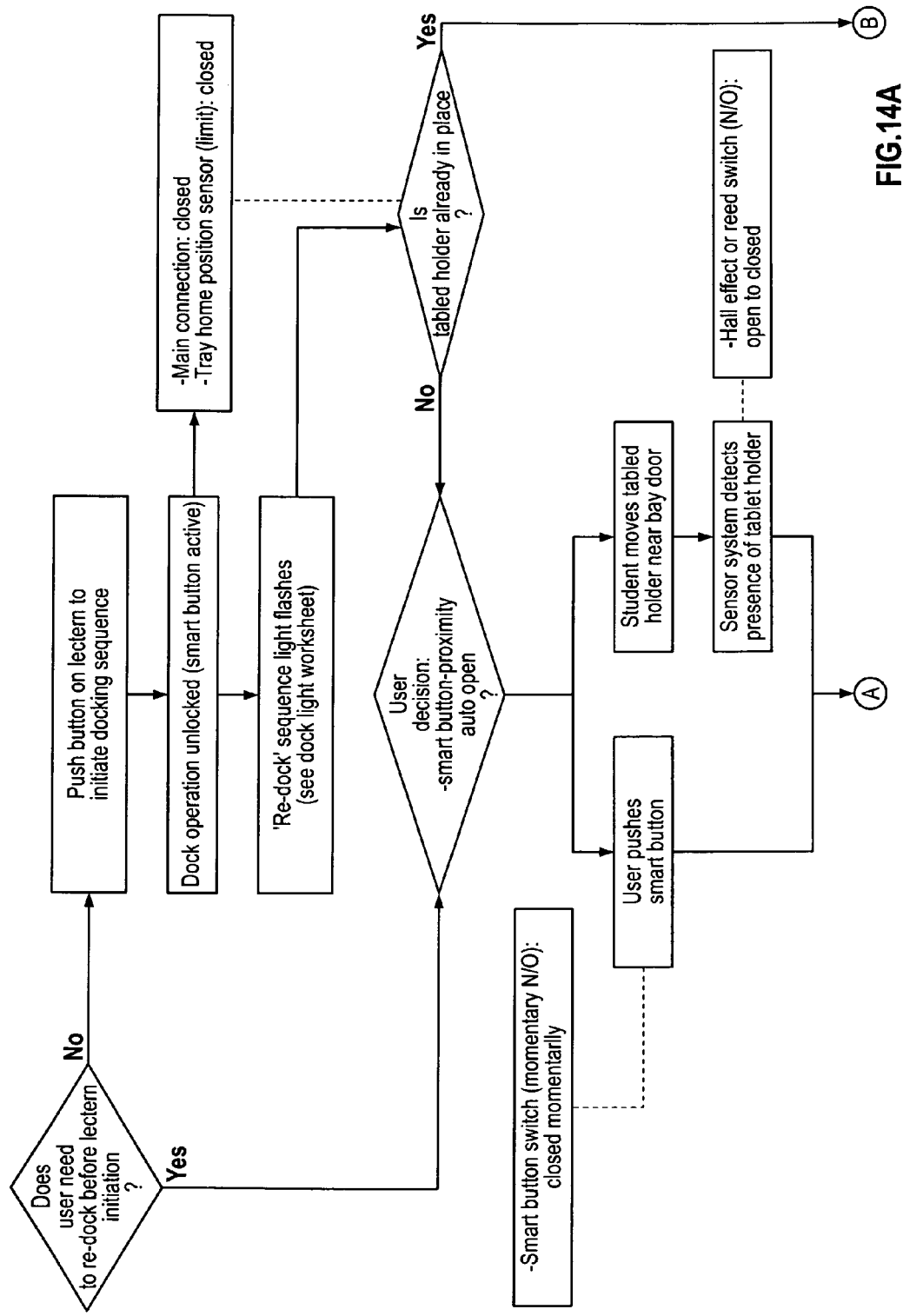
FIG. 14A is the first portion of a flowchart diagramming a possible preferred docking sequence and methodology for an apparatus and system according to the present disclosure, with designations A and B in this figure indicating the continuation of the flowchart on FIG. 14B.
Figure 14B:
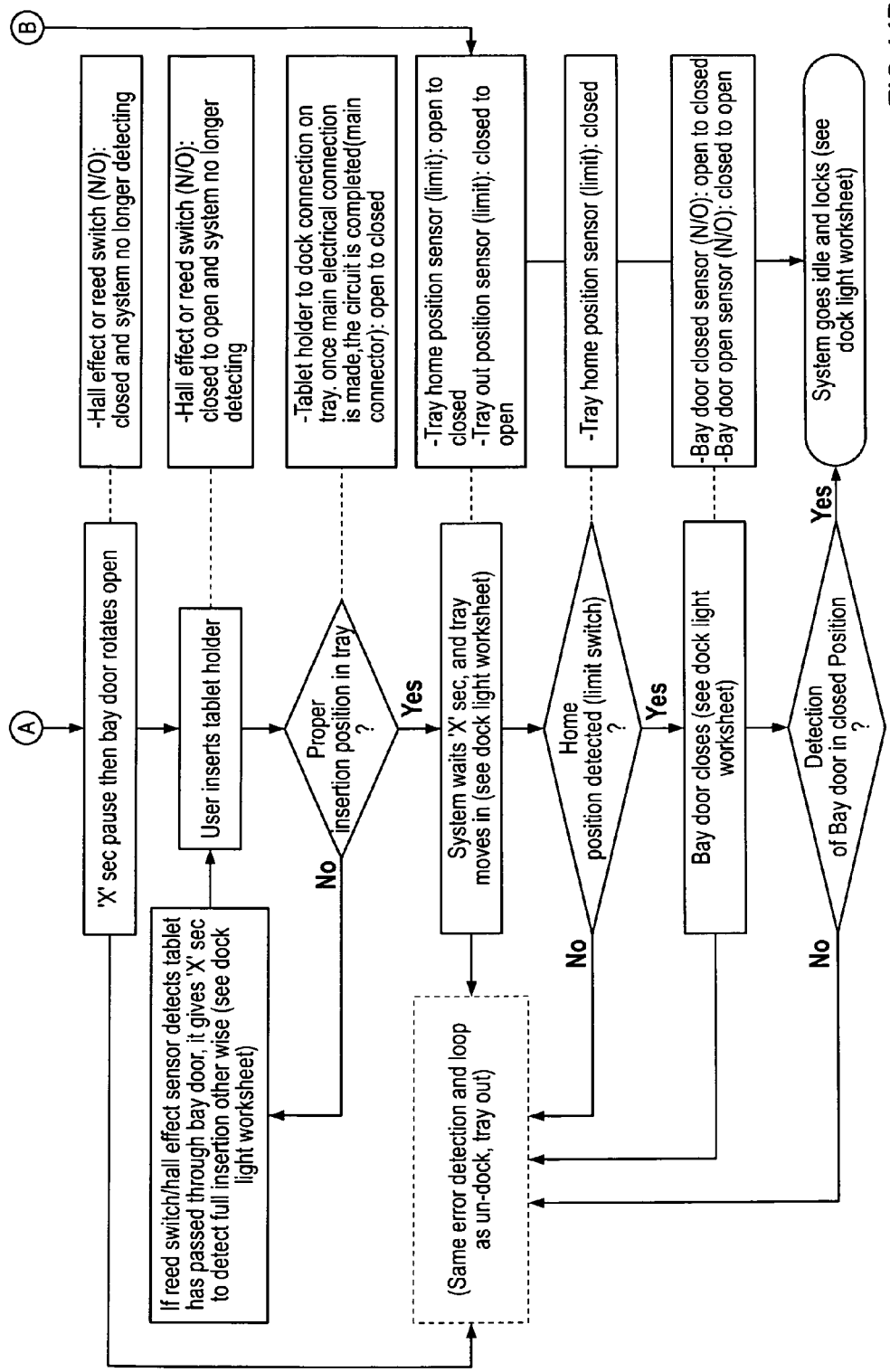
FIG. 14B is a continuation of the flowchart depicted in FIG. 14A, with designations A and B in this figure corresponding to designations A and B in FIG. 14A.

An embodiment of a TDD system including one or more linked/networked docking stations also executes a docking sequence for restoring at least one (or more typically all) the tablets to storage within corresponding docks. FIGS. 14 and 14B provide a flowchart disclosing a preferred docking sequence method. The docking sequence involves certain steps and modes similar to those of the undocking sequence, but is not merely a reversal of the undocking sequence. When it is desired to begin the docking sequence, the supervisor at the master control operates a button on the master control. The operation of the button sends a system signal to begin the re-dock initiation mode. The signal unlocks the dock operation at each docking station, activating the smart button at each station to an "active" mode. During the re-dock initiation mode, the status light (or re-docking sequence light) at each docking station increases in brightness to about 100% brightness and begins blinking to alert the user at a station that the smart button thereon is active, and that the docking station is operable to re-dock the tablet holder. The re-dock initiation mode lasts, for example, at least 5 to 10 seconds, during which the user at the station (with his tablet holder outside the dock) is expected to place his tablet holder into the tray, and to operate his dock to open the bay door to begin the retraction of the tablet tray into the dock.

In one embodiment of the system, there are provided means for detecting whether the tablet holder is already in place within the tray assembly at the beginning of the re-dock initiation mode. For example, if the main electrical connection between the tablet holder and the tray assembly is closed, this signals that the tablet holder is in place in the tray; if the tray back limit switch likewise is closed, the tablet holder is already in place and the tray assembly is in its home position. A tablet holder and tray assembly would already be in storage or home position, most typically, in the event there was no user at the particular docking station during the earlier undocking sequence—in which case the tablet holder never left the dock.

If, at the beginning of the re-dock initiation mode, the tablet holder and tray assembly are in the home (back) position, the system signals the station to go to idle mode and the station dock locks electronically against physical access to the tablet holder therein.

The TDD system preferably permits a user, at a given docking station, to re-dock his tablet holder prior to the supervisor triggering, from the master control, the re-dock initiation mode. Such a circumstance may be, for example, a student user needed to depart a classroom before the conclusion of the normal class period. If an individual user at a station needs to re-dock his tablet holder before the supervisor is to operate the button to start the system wide re-dock initiation, he may do so by either operating the smart button at his docking station, or by activating a proximity automatic open option, described herein below.

If at the beginning of the re-dock initiation mode the tablet holder for a station is not in place in the tray (i.e., the tablet is in active use), the user (of one preferred embodiment) may elect between either of two ways to start the active docking mode at his docking station. (In alternative embodiments of the TDD system, one or the other of these ways to start active docking mode is available for execution.) A first alternative is for the user to elect to start active docking by operating the smart button at his station. Operation of the smart button closes momentarily the smart button switch in communication with the button, signaling to begin opening the bay door on the dock. The status light at the docking station changes to begin blinking or flashing at a relatively faster rate. The docking mode begins, and after a brief pause, the bay door opens on the dock. In a second alternative way to start active docking, the user moves his tablet holder closely proximate to the bay door to trigger a proximity sensor in the bay door aperture (e.g., the closing of a reed switch) or to trigger a proximity sensor near the bay door aperture (e.g., actuation of a Hall Effect sensor); the triggering of the proximity sensor generates in the system a signal to actuate the bay door motor to begin opening the bay door. As with the first alternative immediately above, the status light at the station changes to begin blinking or flashing at a relatively faster pulse rate. The docking mode begins, and after a very brief pause, the bay door opens on the dock.

Continued reference is made to FIGS. 14 A and 14B. The user then places the tablet holder into the forward tray. The docking station is devised and configured such that, when the tray is in the forward position, the proper insertion of the tablet holder into the tray involves the insertion of a distal end of the tablet holder into the bay door aperture (the bay door being open). Further, the proper placement of the tablet holder in the tray also re-connects electrically the tablet holder with the tray assembly, as their respective main electrical connections couple to close the main holder-to-dock electrical communication circuit. (Ordinarily, if the user fails to properly insert the tablet holder in the tray, the desired electrical coupling between the tablet holder and the tray assembly will not occur, and the holder-to-dock circuit remains open.) After the distal portion of the tablet holder remains for a time within the bay door aperture, the proximity switch (Hall Effect sensor or reed switch) opens, and the system is no longer detecting the tablet's presence. If the proximity sensor detects that the tablet has passed through the bay door aperture, the system times a predetermined engagement period (for example, about 5 seconds) to detect full and complete engagement (i.e., electrical connection) of the tablet holder with the tray. In a preferred embodiment, if the complete engagement is not detected (the tray-to-holder circuit is still open) within the timed engagement period, the user is so notified by the status light changing color (e.g., from blinking green to constant red). This "not inserted enough" mode continues until the holder is properly inserted and coupled with the tray; so long as the electrical connection between the tablet holder and tray is open, tray assembly driving motor does not operate to retract the tray.

The user may then adjust the tablet holder position, and/or remove it from and re-insert it into the tray, to assure fully proper insertion of the holder in the tray. When the tablet holder is properly inserted into the tray, the status light will resume its ready color (e.g., green) blinking slowly, indicating that active docking may proceed. In a preferred embodiment, the detection of a properly completed insertion of the holder in the tray marks the beginning of a "successful dock" mode, during which the status light indicates a steady ready color at about 100% brightness, lasting about 2-5 seconds.

After the tablet holder has been fully and properly inserted and engaged into the tray, the system pauses briefly, and the active docking mode commences. During the active docking mode the tray, bearing the tablet holder, is retracted mechanically from its forward position and rearward in the dock to the tray home position within the dock. When the tray begins its retracting motion, the tray out position sensor (tray forward limit switch) changes from closed to open; when the tray completes the reacting motion and arriving at the tray home limit position, the tray home position sensor (tray back limit switch) changes from open to closed. When the tray is detected to be at home position, the signal is generated to close the bay door, and the bay door closing assembly with bay door motor is actuated, closing the door. The closing of the bay door results in a change in the bay door closed limit switch changing from an open sensed condition to closed, while the bay door open limit switch changes from an closed sensed condition to open. The closing of the bay door closed limit switch signals the system to power down to an idle, and the dock is locked closed to prevent access to the tablet holder.

Importantly, the same error detection means preferably are active during a docking sequence as were active during the undock sequence as described previously. To prevent damage to a docking station due to an obstruction or jam, once the docking mode is commenced with a signal to open the bay door during the docking sequence, the over-current detector(s), and/or the clutch(es), or the logic-based optical position/time detector(s) in communication with the bay door drive motor and the tray assembly drive motor, act to pause motor power in the event the bay door and/or tray is obstructed or jammed during operative movement.

System operation methodology includes alternative docking and undocking sequences to permit a supervisor to regulate the storage and use of one or more tablets. To initiate an alternative undock sequence procedure, the supervisor pushes a button on the master control to unlock the plurality of docking stations, releasing them for usage. The electronics system is thus actuated, and the pushing of the supervisor's undock button activates the smart button on each docking station, so that each docking station can be used. The operation of the TDD system with respect to one docking station in the system serves to describe how the system may operate with respect to any other docking station in a system incorporating a plurality of stations.

The undock signal is sent to each docking station, which unlocks operation of each dock. Upon the unlocking of a station dock, a status light, visible to a user at the docking station, is illuminated at the station. In a preferred embodiment, the undock sequence light is a green light, which flashes for a time to alert the user at the station that the dock is unlocked for use. The status light may be a green LED, or a multicolor LED, which when illuminated is seen through a clear plastic cover or light-pipe on the docking station. The status light preferably is integrated with the station smart button on the dock, or optionally may be separate from but nearby the smart button. The smart button optionally is a momentary (default open) tactile switch. In an alternative embodiment of the system, each docking station may be provided with means, such as a card reader (e.g., for reading an RF signal or magnetic encoded strip) or keypad, whereby the user at that station can identify himself to the system, thus limiting access to selected person(s) and/or permitting an electronic record of the individual who accessed the tablet at that station. The status light flashes or blinks for a predetermined available alert time (e.g., several seconds), during which time the user at the station, if the user intends to use the tablet therein, pushes the station smart button. If there is no user at the particular station, or if the user elects not to use the tablet, the TDD system detects that the smart button has not been pushed during the available alert time. This inactivity of a particular docking station (i.e., the smart button has not been pushed during the available alert time), is detected by the TDD system. The TDD system then signals to the inactive docking station to: (a) lock the docking station against use; and (b) switch the station's status light from a flashing to a "continually on" illumination mode.

Upon viewing the illumination of the blinking status light, a user at the station desiring to access the tablet pushes the smart button. Pushing the smart button actuates the opening mechanisms of the dock itself. The docking station pauses for a ready pause period of time, and the tablet tray assembly then starts advancing in the main dock body. The status light blinks or flashes while the tablet tray assembly advances forward in the main dock body. The movement of the tray assembly in the dock body preferably is driven by the gear motor and rack-and-pinion inside the dock, with a clutch and/or over-current protection. Once the tray assembly begins moving forward, the home position switch/sensor in the dock is released; the electrical connection between the dock body and the tablet holder also is terminated. During the tray assembly's approximately first inch of travel, the dock's bay door is signaled to open (e.g., by rotating), thus allowing the tray assembly to move forward to project the tablet holder through the bay aperture a distance from the main dock body to present the tablet to the user.

If the bay door and ejecting tray assembly are clear of obstructions, the tray assembly continues to move forward in the main dock body. As the tray assembly moves forward, the internal lock ramp tapers away, disengaging the tablet holder lock plate to release the tablet holder. (Optionally, if the user pulls the tablet from the tray assembly before the tray has moved fully forward in the dock body, a warning light (e.g. status light) on the dock body may flash or change color, but the tray still moves forward to avoid damage; tablet removal is detected when an electrical connection is made (for example, by the reed switch, or by means of some other suitable sensor such as a Hall effect sensor).) When the tray has move fully forward to the "out position," a limit switch is triggered, the tray driving motor stops, the tray's motion ceases, and the status light turns off. Detection of the tray out position preferably is by a tray forward limit switch in the dock, with an over-current second layer of protection. The TDD system thus detects the tray forward condition, and turns on a "tablet ready" light (e.g. the status light LED, showing solid green). The system pauses for a predetermined tablet ready period of time, while the tablet ready light indicates to the user that the tablet properly is ready to be retrieved. The user may then grasp the tablet, in the tablet holder, and completely remove it from the dock body.

The alternative undock sequence includes means for protecting the apparatus from overheating or mechanical failure due to obstructions to the operation of the tray assembly or bay door. The obstruction protection means serves to detect when proper movement of the tray and/or the bay door is arrested, for example by the presence of a foreign object. The protection means may include known detection and rectification elements, for example, one or more of an electronic over-current detector, or a mechanical slip clutch at the drive gearing of the tray, or a slip clutch at the driving gear for the bay door, and/or logic-based electronics for monitoring (e.g., optically or electrically) the positions of the tray and/or bay door versus time. In the event an obstruction is detected while the tray is moving, or while the bay door is moving, the TDD system signals the activation of an obstruction warning light (e.g., status light) which alerts the user, for example by brightly blinking red in color, that the docking station operation is obstructed. Optionally but preferably, when an obstruction has been detected, the TDD system signals the operation of the motor(s) (tray assembly drive motor, bay door drive motor) to pause and/or reverse direction slightly to facilitate the removal of the interfering obstruction. The user locates/identifies and removes the obstruction.

Upon clearing the obstruction, the user again pushes the smart button to re-commence the movement of the bay door and tray assembly to eject the tablet holder, and the undock sequence resumes from about the point at which it was interrupted. The obstruction warning light blinks during a predetermined obstruction removal time programmed in the system; in the event that the interfering obstruction is not removed during the timed obstruction removal period, the TDD system can transmit a signal to the master control to activate a visual and/or audio alert the supervisor of the ongoing difficulty at the particular docking station. The supervisor can then attempt further remediation of the obstruction interference according to judgment.

The user's removal of the tablet holder from the dock triggers a detector/sensor, such as the reed switch or Hall Effect sensor or infrared sensor or the like, near the bay door aperture in the main dock. In this alternative undock sequence, the removal of the tablet holder from the dock triggers the TDD system to commence a closing of the main dock. The tray assembly may remain in place after the bay doors close, ready in the tray forward position to receive the tablet holder when the bay doors open to begin a docking sequence. Alternatively, after a brief pause, the tray begins inward motion to return to home position within the dock; while the tray is in motion, the status light may blink rapidly pending the completion of tray retraction. After the tray back limit switch/sensor detects that the tray nearly has or has been restored to home position, the tray drive motor is deactivated, while approximately concurrently the drive motor of the bay door is actuated long enough to close the bay door. When the tray assembly has obtained the home position and the bay door is closed, the status light may indicate a successful closure of the dock by changing to a constant unblinking bright green, which may then turn off completely after a predetermined time-out period. In either sequence, an option is for the TDD system to then signal each and every docking station to lock up against unauthorized further operation, until such time as the supervisor determines an appropriate time for the tablet holders to be returned to the docks (e.g., at the conclusion on a class instruction period).

There optionally may be provided at or near the bay door aperture a sensor (e.g. an infrared sensor) for detecting if any sizeable foreign object has been surreptitiously inserted into the bay door aperture after the tablet was removed but before the withdrawal of the tray assembly and closure of the bay door. If an inserted foreign object is detected, the system signals an interruption of the operation of the tray drive motor and/or bay door to prevent damage.

Related to the immediately described alternative undocking sequence is an alternative docking sequence. To initiate the alternative docking sequence, the supervisor pushes a button on the master control to unlock the plurality of docking stations, releasing them for usage. The electronics system is thus actuated, and the pushing of the supervisor's undock button activates the smart button on each docking station, so that each docking station can be used. With the smart button at each docking station thus activated, the status light (re-dock sequence light) at the station flashes green, and user at each station can opt to operate his associated station to obtain access to the tablet holder.

If, at the commencement of this alternative docking sequence, the tablet holder already is in place within the tray of a particular docking station (i.e., the electrical connection between the tablet holder and tray is closed), the system then tests (e.g., by the home position (tray back) limit switch/sensor being closed) whether the tray assembly is in the full home position. If the tray is sensed to be in the home position, the status light at the station illuminates for a predetermined period of time (e.g., a few seconds) and then turns off. There is no further tray docking sequence for the docking station.

The user at a docking station, desiring to return the tablet holder to the dock, operates the smart button at her station to commence the docking sequence. (If in an alternative embodiment the tray assembly was stored in the home position, the docking sequence includes the function of the tray assembly driving motor moving the tray forward in the dock.) In an alternative embodiment, rather than operating the smart button, the user may simply move the tablet holder (more specifically, for example, a distal end of the holder) near the bay door aperture of the dock. The Hall Effects (or IR) or reed switch sensor at or near the bay door aperture in the dock senses the proximity of the tablet holder, and upon such sensing the system signals the actuation of the tray assembly driving motor.

The docking station pauses for a ready pause period of time, and the tablet tray assembly advances forward in the main dock body. The status light blinks or flashes while the tablet tray assembly moves in the main dock body toward the out position. Once the tray assembly begins moving forward, the home position switch/sensor in the dock is opened. During the tray assembly's approximately first inch of travel, the dock's bay door is signaled to open (e.g., by rotating), thus allowing the tray assembly to become available, via the bay aperture, to receive the tablet holder from the user.

If the tray and bay door operate without obstruction, the user then places the tablet holder into the tray, which is in full forward position. Obstructions to the movement of the tray and the bay door are detected during this alternative docking sequence in the same manner as in the alternative undock sequence described above.

The user inserts the tablet holder into the tray, which is in the forward position. In one embodiment, spring retainer clips disposed on the tray are configured first to offer mild resistance to the user's insertion of the tablet holder, then a tactile detent action to inform the user that the tablet is properly in place within the tray.

A sensor (for example, a Hall Effect reed sensor or IR sensor) may be provided at or near the bay door aperture to sense whether the tablet holder has been properly inserted through the bay door aperture and into the tray. (If the proximity sensor at the bay door aperture detects that the tablet holder has passed through the bay door aperture, it signals the system to time a period of a few seconds to detect (by the home position limit switch) full retraction into the dock; otherwise the status light is signaled to flash red to warn of the malfunction.) If the tablet is properly positioned in the tray and coupled therewith, the system signals the change of the status light from blinking green to constant solid green to indicate that the tablet holder and tray are in condition to be retracted into the dock. The TDD system pauses the station a few seconds, then signals the status light to begin blinking green and the driving motor(s) to begin operating to retract the tray into the dock. If the tray's movement into the dock is free of obstruction, the docking sequence continues until the tray back limit switch signals that the tray has reached the home position, and the bay door is closed.

As the tray assembly moves rearward during this docking sequence, the internal lock ramp tapers up, contacting the holder lock plate to lock the tablet holder in the tray. After the tray assembly has moved fully rearward to the home or "tray back" position, the tray back limit switch is triggered, the tray driving motor stops, the tray's motion ceases, and the status light ceases flashing. Detection of the tray home position preferably is by the tray back limit switch in the dock, with an over-current second layer of protection. The TDD system thus detects the tray home condition, and turns on a "tablet home" light (e.g. the status light LED, showing solid green).

If the progressive operation of either the moving tray or the rotating bay door is obstructed during the docking sequence, the over-current or optical logical detector senses the interruption, and signals the status light at the station to flash red. The affected drive motor(s) are signaled to pause, and/or reverse slightly, to aid in obstruction removal. If the obstruction is not cleared in a timely manner, an alert optionally is signaled to the supervisor at the master control. Upon clearing the obstruction, the user at the affected station again operates the smart button, and the docking sequence resumes. Once the bay door is detected to be closed by the bay door closed limit switch, and the home position is detected by the tray back limit switch, the indicator light illuminates for a period, the TDD system signals the deactivation of the smart button, and all the lights at the docking station can be turned off.

Figure 15:
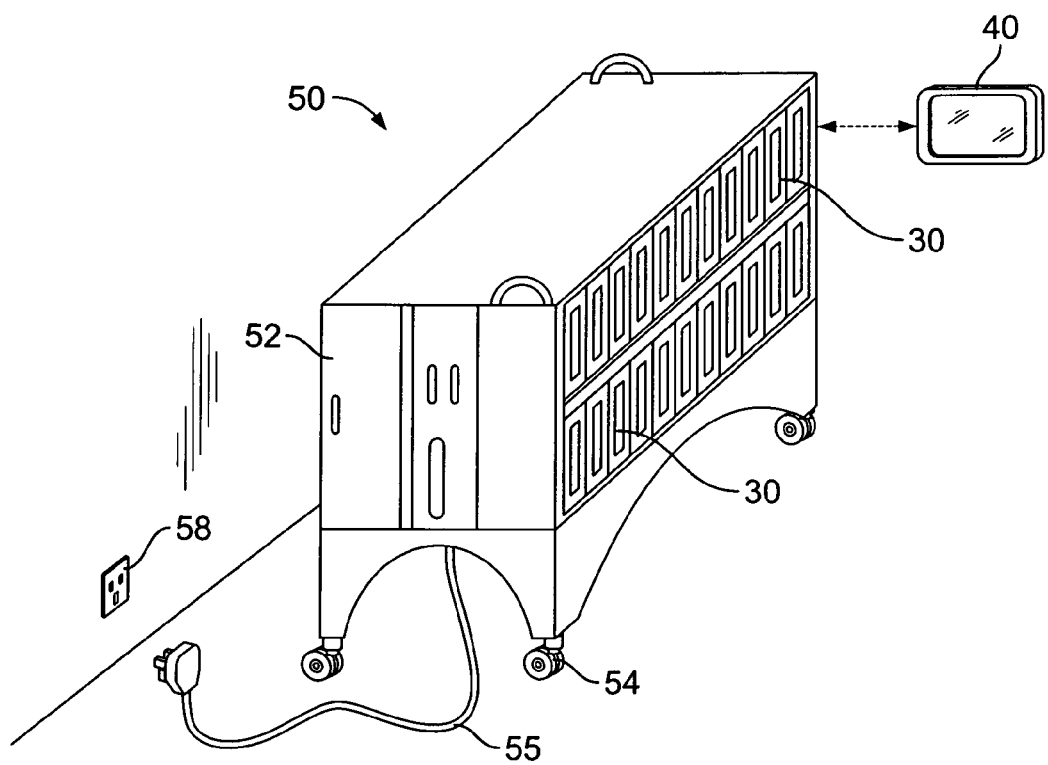
FIG. 15 is a perspective view of a plurality of docking stations in accordance with the present disclosure mounted for cooperative use upon a wheeled cart.

Attention is invited to FIG. 15, illustrating by way of example one mode in which a TDD system according to the present disclosure may be deployed. In this example, multiple docking stations are mounted upon a cart 50. Thus in this example the cart 50 serves as the foundation upon which the individual docks are secured. Other examples of a "foundation" include tables, desks, and cabinets, or the like, upon which one or more main docks are mounted. A cart 50 offers advantages of portability for use with a plurality of main docks. The cart 50 has a cabinet or frame 52 equipped with wheels or casters 54 generally according to convention. Casters 54 permit the cart 50 to be mobile, for example, to be rolled from a lockable closet to a classroom for tablets use, and then returned to the closet after use. A plurality of main docks 30 are securely mounted upon the frame 52 in any suitable arrangement which permits ready access to the bay door of each dock. (Two rows of twelve docks 30 are visible on one side of the cart frame 52 in FIG. 15; twenty-four more docks may be similarly arranged on the opposite side of the cart but not seen in FIG. 15.) The cart 50 may include an appropriate power cord 55 adapted to be electrically connected with a source of electrical power, for example by being plugged into a conventional 110VAC building wall electrical outlet 58. Requisite transformers and associated circuitry and components for converting high-voltage alternating current to low-voltage direct current (for charging computer tablets) may be provided on cart 50 but are not shown in FIG. 15. One or more tablet holders 40 (one seen in FIG. 15) are disposable within correlated ones of the main docks 30 on the cart; ordinarily, there is provided a plurality of tablet holders 40 corresponding in number to the plurality of docks on the cart 50, each holder 40 and its contained tablet being associated with a particular station dock.

It is understood from FIG. 15 that in one mode of practicing the invention, the foundation cart 50, when not in active use, may be stored in a secure location with one or more tablet holders 40 docked within corresponding ones of a plurality of main docks 30 thereon. In the secure location, the cart is electrically connected to a power source by means of the power cord 55, whereby the docking stations are powered to permit tablet batteries to be charged during cart storage. When desired, a supervisory person accesses the foundation cart 50 at the secure location, and disconnects the cord 55 from the power source outlet (and, for example, stows the cord on/in the cart frame). The cart 50 is wheeled to, for example, a classroom, and optionally the cord 55 is again plugged into a power source outlet 58 in the classroom. The supervisor by means of a master control 20 is able to lock and unlock in a controlled manner the plurality of main docks 30 on the cart 50. Individual student users may then retrieve selected tablet holders 40, each holding a charged tablet, from associated main docks 30. The individual tablet holders 40 may then timely be restored to a dock on the cart when no longer in use, as suggested by the directional line at holder 40 in FIG. 15. At the end of a session, the supervisor can readily check the status of each dock 30, by viewing the indicator lights 34 on the docks, to determine whether all the tablet holders have been replaced into the docks on the cart. An amber colored indicator light on a particular dock alerts to the absence of a tablet holder therein. When the supervisor is satisfied that all the tablet holders have been restored to the docks on the cart, the cart can by unplugged, if necessary, and rolled back to the storage location.

There is provided, therefore, a computer tablet storage system comprising a main dock and a tablet holder. The main dock includes a front panel assembly defining a bay door aperture; a dock housing around a substantially hollow interior; a tablet tray assembly movable toward and away from the bay door aperture and within the interior of the dock housing; and means, such as a controllable motor cooperative with gears/pinions, for moving the tablet tray assembly within the dock housing. The tablet holder is releasably engageable with the tray assembly, and is adapted to receive and retain a computer tablet. In the system, the tablet tray assembly is movable between a tray forward position in which any tablet holder engaged with the tray assembly is at least partially extended through the bay door aperture by the movement of the tray assembly, and a tray back position in which any tablet engaged with the tray assembly is retracted completely within the dock housing interior.

The at least one main dock may comprise a plurality of main docks, and the at least one tablet holder thus may comprise a plurality of tablet holders corresponding in number to the plurality of main docks.

The main dock further preferably comprises a button (i.e., the "smart" button) in signal communication with the means for moving the tablet tray assembly within the dock housing, for actuating the means for moving the tablet tray assembly to move the tray assembly toward the tray forward position to cause at least partial ejection of the tablet holder from the main dock via the bay door aperture. The means for moving the tablet tray assembly may include a motor which drives the tray assembly by rotating a gear or gear train in functional cooperation with a notched rack.

The preferred system includes a master control, preferably a wireless remote control, in signal communication with the main dock, such that command signals from the master control enable or disable the smart button on the main dock to regulate whether the tablet holder can be ejected from the main dock by operation of the smart switch. The front panel assembly preferably includes a bay door movable to close the bay door aperture when the tray assembly is in the "tray back" position, and movable to open the bay door aperture when the tray assembly is moving toward the "tray forward" position. The main dock includes means, such as a motor and gears, for moving the bay door to open the bay door, and sensor means (such as a reed sensor and switch) on the main dock for detecting when the tablet holder is proximate to the bay door aperture. Because the sensor means is in signal communication with the means for moving the bay door, when the tablet holder is proximate to the bay door aperture, the sensor means signals an actuation of the means for moving the bay door thereby to open the bay door.

The preferred system also includes mechanical means for securing the tablet holder within the main dock when the tray assembly is in the tray back position, wherein movement of the tray assembly in the dock housing effectuates unlocking and locking interactions between the tablet holder and the dock. The means for securing may include tapered ramps on the floor of the main dock's interior, and such ramps cooperative with a movable tablet holder lock plate, releasably to lock the tablet holder within the tray assembly of the dock when the tablet holder is retracted to the home or "tray back" position within the dock.

Although the invention has been described in detail with particular reference to these preferred embodiments, other embodiments can achieve the same results. Variations and modifications of the present invention will be obvious to those skilled in the art and it is intended to cover all such modifications and equivalents. In this disclosure, reference is made to the accompanying drawings which form a part hereof, and which illustrate specific embodiments and methods by which the invention may be practiced. These embodiments are described herein to enable those skilled in the art to practice the invention, but is shall be evident that other embodiments may be used and that the configuration and details of structure may be modified without departing from the spirit and scope of the present invention. Therefore, the foregoing detailed description must not be construed as limiting. The scope of the present invention is defined by the appended claims.

What is claimed is:

1. A computer tablet storage system comprising:
   a main dock comprising:
      a front panel assembly defining a bay door aperture;
      a dock housing around a substantially hollow interior;
      a tablet tray assembly movable, within the interior of the dock housing, toward and away from the bay door aperture; and
      means for moving the tablet tray assembly within the dock housing; and
   a tablet holder releasably engageable with the tray assembly and adapted to retain a computer tablet;
   wherein the tablet tray assembly is movable between:
      a tray forward position in which any tablet holder engaged with the tray assembly is at least partially extended through the bay door aperture by the movement of the tray assembly; and
      a tray back position in which any tablet holder engaged with the tray assembly is retracted completely within the dock housing interior.

2. A system according to claim 1 wherein the main dock comprises a plurality of main docks, and the tablet holder comprises a plurality of tablet holders corresponding in number to the plurality of main docks.

3. The system of claim 1 wherein the main dock further comprises a button, in signal communication with the means for moving the tablet tray assembly within the dock housing, for actuating the means for moving the tablet tray assembly to move the tray assembly toward the tray forward position to cause at least partial ejection of the tablet holder from the main dock via the bay door aperture.

4. The system of claim 3 further comprising a master control in signal communication with the main dock, wherein command signals from the master control enable or disable the button on the main dock to regulate the ejection of the tablet holder from the main dock.

5. The system of claim 1 wherein the front panel assembly comprises a bay door movable to close the bay door aperture when the tray assembly is in the tray back position, and movable to open the bay door aperture when the tray assembly is moving toward the tray forward position.

6. The system of claim 5 further comprising:
   means for moving the bay door to open the bay door; and
   sensor means on the main dock for detecting when the tablet holder is proximate to the bay door aperture, the sensor means in signal communication with the means for moving the bay door;
   wherein when the tablet holder is proximate to the bay door aperture, the sensor means signals an actuation of the means for moving the bay door thereby to open the bay door.

7. The system of claim 1 further comprising mechanical means for securing the tablet holder within the main dock when the tray assembly is in the tray back position, wherein movement of the tray assembly in the dock housing effectuates unlocking and locking interactions between the tablet holder and the dock.

8. A computer tablet storage system comprising:
   a main dock comprising:
      a front panel defining a bay door aperture;
      a dock housing at least partially enclosing a substantially hollow interior;
      a tablet tray assembly movable, within the interior of the dock housing, toward and away from the bay door aperture;
      means for moving the tablet tray assembly within the dock housing; and
      a tablet holder releasably engageable with the tray assembly and adapted to retain a computer tablet; and
   a master control in signal communication with the main dock, wherein wireless signals from the master control enable or disable operation of the means for moving the tablet tray assembly within the dock housing;
   wherein the tablet tray assembly is movable between:
      a tray forward position in which any tablet holder engaged with the tray assembly is at least partially extended through the bay door aperture by the movement of the tray assembly; and
      a tray back position in which any tablet holder engaged with the tray assembly is refracted completely within the dock housing interior.

9. A system according to claim 8 wherein the main dock comprises a plurality of main docks, and the tablet holder comprises a plurality of tablet holders corresponding in number to the plurality of main docks.

10. The system of claim 8 wherein the front panel further comprises an assembly having a button, in signal communication with the means for moving the tablet tray assembly within the dock housing, for actuating the means for moving the tablet tray assembly to move the tray assembly toward the tray forward position to cause at least partial ejection of the tablet holder from the main dock via the bay door aperture.

11. The system of claim 10 wherein the wireless signals from the master control enable or disable the button on the main dock to allow or prevent the ejection of the tablet holder from the main dock.

12. The system of claim 10 wherein the front panel comprises a front panel assembly comprising:

a bay door movable to close the bay door aperture when the tray assembly is in the tray back position, and movable to open the bay door aperture when the tray assembly is moving toward the tray forward position; and a motor for moving the door.

13. A system according to claim 12 wherein the tablet holder comprises a magnet, and wherein further the front panel assembly further comprises a reed switch, responsive to magnetic fields from the tablet holder magnet, in communication with the motor for moving the door; wherein when the magnet is proximate to the bay door aperture, a resulting response in the reed switch signals an actuation of the bay door motor thereby to open the bay door.

14. A system according to claim 8 wherein the tray assembly further comprises a dock connector, and the tablet holder comprises a power printed circuit board having a connection port engageable with the dock connector, whereby the tablet holder may be electrically connected to the tray assembly.

\* \* \* \* \*